US010745538B2

(12) United States Patent
Peterson et al.

(10) Patent No.: US 10,745,538 B2
(45) Date of Patent: Aug. 18, 2020

(54) THERMOPLASTIC POLYMER COMPOSITIONS

(71) Applicant: Milliken & Company, Spartanburg, SC (US)

(72) Inventors: Joseph J. Peterson, Warren, PA (US); Scott R. Trenor, Greenville, SC (US); Suchitra Datta, Spartanburg, SC (US); Adam J. Sobczak, Easley, SC (US)

(73) Assignee: Milliken & Company, Spartanburg, SC (US)

( * ) Notice: Subject to any disclaimer, the term of this patent is extended or adjusted under 35 U.S.C. 154(b) by 0 days.

(21) Appl. No.: 16/376,456

(22) Filed: Apr. 5, 2019

(65) Prior Publication Data

US 2019/0233614 A1 Aug. 1, 2019

Related U.S. Application Data

(62) Division of application No. 15/040,977, filed on Feb. 10, 2016, now Pat. No. 10,273,346.

(51) Int. Cl.
| | | |
|---|---|---|
| *C08K 5/01* | (2006.01) | |
| *C08K 5/45* | (2006.01) | |
| *C08K 5/14* | (2006.01) | |
| *C08L 23/16* | (2006.01) | |
| *C08L 23/12* | (2006.01) | |
| *C08K 5/03* | (2006.01) | |
| *C08K 5/1535* | (2006.01) | |
| *C08K 5/17* | (2006.01) | |
| *C08K 5/3432* | (2006.01) | |
| *C08L 23/06* | (2006.01) | |
| *C08L 23/08* | (2006.01) | |
| *C08L 23/14* | (2006.01) | |

(52) U.S. Cl.
CPC .................. *C08K 5/01* (2013.01); *C08K 5/03* (2013.01); *C08K 5/14* (2013.01); *C08K 5/1535* (2013.01); *C08K 5/17* (2013.01); *C08K 5/3432* (2013.01); *C08K 5/45* (2013.01); *C08L 23/06* (2013.01); *C08L 23/08* (2013.01); *C08L 23/12* (2013.01); *C08L 23/14* (2013.01); *C08L 23/16* (2013.01); *C08L 2205/02* (2013.01); *C08L 2205/08* (2013.01); *C08L 2207/02* (2013.01); *C08L 2207/20* (2013.01)

(58) Field of Classification Search
CPC ... C08K 5/03; C08K 5/17; C08K 5/01; C08K 5/45; C08K 5/14; C08L 23/06; C08L 23/08; C08L 23/14; C08L 23/16; C08L 23/12
USPC ......................................................... 524/84
See application file for complete search history.

(56) References Cited

U.S. PATENT DOCUMENTS

| | | | |
|---|---|---|---|
| 3,301,837 A | 1/1967 | Bartorelli et al. | |
| 3,376,304 A * | 4/1968 | Mohrbacher | ............ A61K 8/34 |
| | | | 546/176 |
| 3,379,677 A | 4/1968 | Dressler et al. | |
| 5,369,159 A | 11/1994 | Nesuadba | |
| 5,428,162 A | 6/1995 | Nesuadba | |
| 5,639,822 A | 6/1997 | Hungenberg et al. | |
| 6,020,437 A | 2/2000 | Mestanza et al. | |
| 6,403,735 B1 * | 6/2002 | Becke | ..................... C07F 17/00 |
| | | | 526/160 |
| 6,620,892 B1 | 9/2003 | Bertin et al. | |
| 6,992,225 B2 | 1/2006 | Grimaldi et al. | |
| 7,019,086 B2 | 3/2006 | Onoi et al. | |
| 7,196,144 B2 | 3/2007 | Ashiura et al. | |
| 7,544,743 B2 | 6/2009 | Ciardelli et al. | |
| 7,649,052 B2 | 1/2010 | Massari et al. | |
| 7,772,325 B2 | 8/2010 | Ashiura et al. | |
| 8,207,272 B2 | 6/2012 | Bernreitner et al. | |
| 8,246,880 B2 | 8/2012 | Kawabe et al. | |
| 8,557,926 B2 | 10/2013 | Kawazuna et al. | |
| 8,618,224 B2 | 12/2013 | Horst et al. | |
| 9,410,035 B2 | 8/2016 | Peterson et al. | |
| 2007/0145625 A1 | 6/2007 | Caronia et al. | |
| 2007/0200272 A1 | 8/2007 | Horst et al. | |
| 2010/0151156 A1 | 6/2010 | Kawabe et al. | |
| 2010/0168343 A1 | 7/2010 | Harris et al. | |
| 2011/0172368 A1 | 7/2011 | Stolz-Dunn | |
| 2012/0289620 A1 | 11/2012 | Deheunynck et al. | |

FOREIGN PATENT DOCUMENTS

| | | |
|---|---|---|
| CN | 101277997 A | 10/2008 |
| CN | 101277997 B | 11/2011 |
| DE | 102013001014 A1 | 7/2013 |
| EP | 0 591 102 A1 | 9/1993 |
| EP | 1 354 901 B1 | 3/2006 |
| EP | 1 391 482 B1 | 5/2009 |
| EP | 2 615 135 A1 | 7/2013 |
| FR | 2 582 004 A1 | 5/1986 |
| JP | S4729439 | 11/1972 |
| JP | 2006333021 A | 12/2006 |
| JP | 2008145739 A | 6/2008 |
| KR | 102008055879 | 6/2008 |
| WO | WO 2002/12204 A1 | 2/2002 |
| WO | WO 2007043358 A1 | 4/2007 |
| WO | WO 2010/009825 A1 | 1/2010 |
| WO | WO 2014/014491 A1 | 1/2014 |
| WO | WO 2015/138300 A1 | 9/2015 |

OTHER PUBLICATIONS

Wan, Dong et al., "*Controlling Degradation and Branching Reactions of Polypropylene by Different Heteroaromatic Ring Derivatives*" Elsevier, Polymer Degradation and Stability 97 (2012) 40-48.
(Continued)

*Primary Examiner* — Deve V Hall
(74) *Attorney, Agent, or Firm* — Robert M. Lanning

(57) ABSTRACT

A thermoplastic polymer composition comprises a thermoplastic polymer and a compatibilizing agent comprising a fulvene moiety or a fulvene-derived moiety. A heterophasic polymer composition comprises a propylene polymer phase, an ethylene polymer phase, and a compatibilizing agent comprising a fulvene moiety or a fulvene-derived moiety.

16 Claims, 4 Drawing Sheets

(56) References Cited

OTHER PUBLICATIONS

Xing, Haiping et al., "*Effect of Leaving Group in Dithiocarbamates on Mediating Melt Radical Reaction During Preparing Long Chain Branched Polypropylene*" Elsevier, Polymer 53 (2012) 947-955.

Hyslop, David K. et al., "*Dynamics and Yields of AOTEMPO-Mediated Polyolefin Cross-Linking*" Queen's University, Kingston, Ontario, Canada.

Ei-Sawy, Naeem M. et al., "*Electrical Properties of Modified-Grafted Polypropylene*" Journal of Applied Polymer Science, Vo. 104, 3797-3803 (2207).

Hyslop, David K. et al., "*Functional Nitroxyls for Use in Delayed-Onset Polyolefin Cross-Linking*" Department of Chemical Engineering, Queen's University, Kingston, Ontario, Canada, Macromolecules 2012, 45, 8147-8154.

Al Sagheer, Fakhreia A. et al., "*Investigation of Radiation-Grafted and Radiation-Modified N-Vinyl-2-Pyrrolidone onto Polypropylene Film*" Chemistry Department, Faculty of Science, Kuwait University. Journal of Applied Polymer Science, vol. 76, 282-289 (2000).

Khalil, Magda M. I., et al., "*Gamma-Irradiation Effects on the Thermal and Structural Characteristics of Modified, Grafted Polypropylene*" Journal of Applied Polymer Science, vol. 102, 506-515 (2006).

Wan, Dong et al., *Preparation and Characterization of Long Chain Branched Polypropylene Mediated by Different Heteroaromatic Ring Derivatives* Elsevier, Polymer 54 (2013) 639-651.

Zulli, Fabio, et al., "*Rheology of Long-Chain Branched Polypropylene Copolymers*" Journal of Applied Polymer Science.

Sun, Fangli et al., "*Solid-State Graft Polymerization of Styrene in Spherical Polypropylene Granules in the Presence of TEMPO*" Journal of Applied Polymer Science, vol. 112, 275-282 (2009).

Augier, Sylvain, et al., *Structure and Rheology of Polypropylene with Various Architectures Prepared by Coagent-Assisted Radical Processing* Polym Int 2010; 59: 1499-1505.

Lee, Chun D., "*Structure-Property Relations in Visbroken (Peroxide Treated) Impact Polypropylene Copolymers*" Equistar Chemicals, A Lyondell Company.

U.S. Appl. No. 15/040,977, filed Feb. 10, 2016, Pending.

\* cited by examiner

THERMOPLASTIC POLYMER COMPOSITIONS

CROSS-REFERENCE TO RELATED PATENT APPLICATIONS

This application is a division of co-pending U.S. patent application Ser. No. 15/040,977 filed on Feb. 10, 2016, which application claims, pursuant to 35 U.S.C. § 119(e), the benefit of the filing date of U.S. Patent Application No. 62/114,221 filed on Feb. 10, 2015.

TECHNICAL FIELD OF THE INVENTION

The present invention is directed to thermoplastic polymer compositions comprising a compatibilizing agent containing a fulvene moiety or a fulvene-derived moiety. In one series of embodiment, the invention provides thermoplastic polymer compositions (e.g., polypropylene polymer compositions) having increased melt strength. In another series of embodiments, the invention provides heterophasic polyolefin compositions having increased melt flow rates, as well as high impact strength. Of particular interest are modified polypropylene impact copolymers.

BACKGROUND

The melt flow rate (MFR) of a polymer resin is a function of its molecular weight. In general, increasing the melt flow rate allows the resin to be processed at lower temperatures and to fill complex part geometries. Various prior art methods of increasing the melt flow rate involve melt-blending the resin in an extruder with a compound capable of generating free radicals, such as a peroxide. The weight average molecular weight of the polymer is reduced and the MFR is increased. Increasing the melt flow rate by decreasing the molecular weight of the polyolefin polymer, however, has been found in many cases to have a detrimental effect on the strength of the modified polymer. For example, decreasing the molecular weight of the polymer can significantly lower the impact resistance of the polymer. And this lowered impact resistance can make the polymer unsuitable for use in certain applications or end uses. Accordingly, when extant technologies are utilized, one must strike a compromise between increasing the melt flow rate and undesirably decreasing the impact resistance of the polymer. This compromise often means that the melt flow rate is not increased to the desired level, which requires higher processing temperatures and/or results in lower throughputs. A need therefore remains for additives and processes that can produce polymer compositions having an increased melt flow while preserving, or even improving, the impact resistance of the polymer.

Another important physical property of a polymer resin is its melt strength. Melt strength can be generally described as the resistance of the polymer melt to stretching. The melt strength of the polymer is important because it affects all extrusion processes to some degree. For example, in extruding sheet, the melt strength of the polymer influences drawdown and sag as the sheet travels from the die to the rolls. In film blowing processes, the melt strength of the polymer affects bubble stability and determines how the film can be drawn. In blow molding processes, the melt strength of the polymer affects parison sag, which must be accounted for in order to control wall thickness in the finished article. There are many factors that can affect the melt strength of a polymer, such as the molecular weight distribution and molecular branching of the polymer. And since these factors vary from polymer to polymer, the melt strength can vary widely across different polymer grades. Accordingly, those seeking to use a particular polymer in an extrusion process often spend a significant amount of resources adapting a particular extrusion process (e.g., changing process conditions or modifying or changing equipment) in order to account for the unique melt strength of the particular polymer being used. Given the importance of polymer melt strength in extrusion processes, there is a need within the industry for additives and processes that can modify (e.g. increase) the melt strength of existing polymers. Such additives could be used to change the melt strength of a polymer so that it suits a particular process design, as opposed to the current practice of changing the process design to suit the melt strength of a particular polymer.

BRIEF SUMMARY OF THE INVENTION

The invention generally provides thermoplastic polymer compositions comprising a thermoplastic polymer and a compatibilizing agent which contains at least one fulvene moiety or a fulvene-derived moiety. In one aspect, the invention provides heterophasic polymer compositions comprising a propylene polymer phase and an ethylene polymer phase. The compatibilizing agent is also added to the compositions. The addition of the compatibilizing agent to the compositions has been observed to preserve, or even improve, the impact resistance of the polymer composition when the melt flow rate of the polymer composition is increased by the use of a free radical generator.

In a first embodiment, the invention provides a thermoplastic polymer composition comprising:

(a) a thermoplastic polymer; and (b) about 50 ppm or more of a compatibilizing agent based on the weight of the thermoplastic polymer and the compatibilizing agent, the compatibilizing agent being selected from the group consisting of compounds comprising a moiety conforming to the structure of Formula (I), compounds comprising a moiety conforming to the structure of Formula (III), and compounds conforming to the structure of Formula (V)

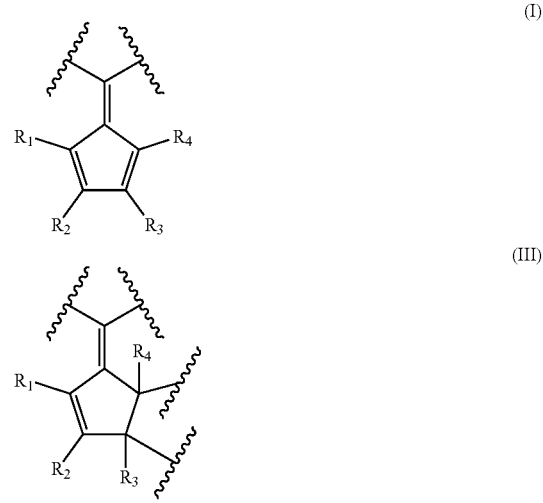

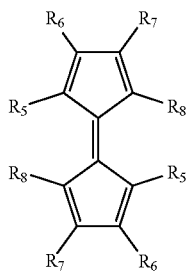

(V)

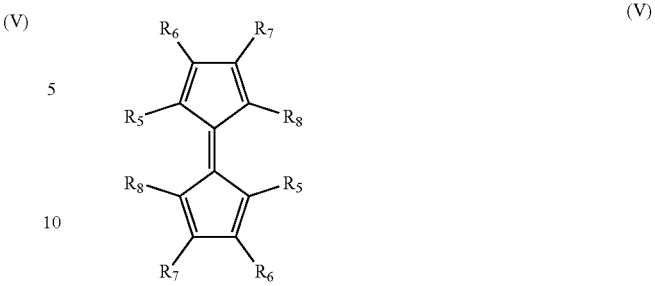

wherein $R_1$, $R_2$, $R_3$, and $R_4$ are independently selected from the group consisting of hydrogen, halogens, hydrocarbyl groups, and substituted hydrocarbyl groups, provided adjacent hydrocarbyl groups or substituted hydrocarbyl groups can be combined to form a secondary ring fused to the ring of the moiety; provided at least one of $R_1$, $R_2$, $R_3$, and $R_4$ is a hydrogen; and $R_5$, $R_6$, $R_7$, and $R_8$ are independently selected from the group consisting of halogens.

In a second embodiment, the invention provides a heterophasic polymer composition comprising:

(a) a propylene polymer phase comprising propylene polymers selected from the group consisting of polypropylene homopolymers and copolymers of propylene and up to 50 wt. % of one or more comonomers selected from the group consisting of ethylene and $C_4$-$C_{10}$ α-olefin monomers;

(b) an ethylene polymer phase comprising ethylene polymers selected from the group consisting of ethylene homopolymers and copolymers of ethylene and one or more $C_3$-$C_{10}$ α-olefin monomers; and (c) a compatibilizing agent, the compatibilizing agent being selected from the group consisting of compounds comprising a moiety conforming to the structure of Formula (I), compounds comprising a moiety conforming to the structure of Formula (III), and compounds conforming to the structure of Formula (V)

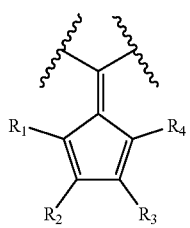

(I)

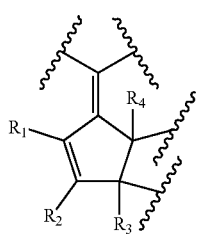

(III)

wherein $R_1$, $R_2$, $R_3$, and $R_4$ are independently selected from the group consisting of hydrogen, halogens, hydrocarbyl groups, and substituted hydrocarbyl groups, provided adjacent hydrocarbyl groups or substituted hydrocarbyl groups can be combined to form a secondary ring fused to the ring of the moiety; provided at least one of $R_1$, $R_2$, $R_3$, and $R_4$ is a hydrogen; and $R_5$, $R_6$, $R_7$, and $R_8$ are independently selected from the group consisting of halogens.

DETAILED DESCRIPTION

Figure 1:
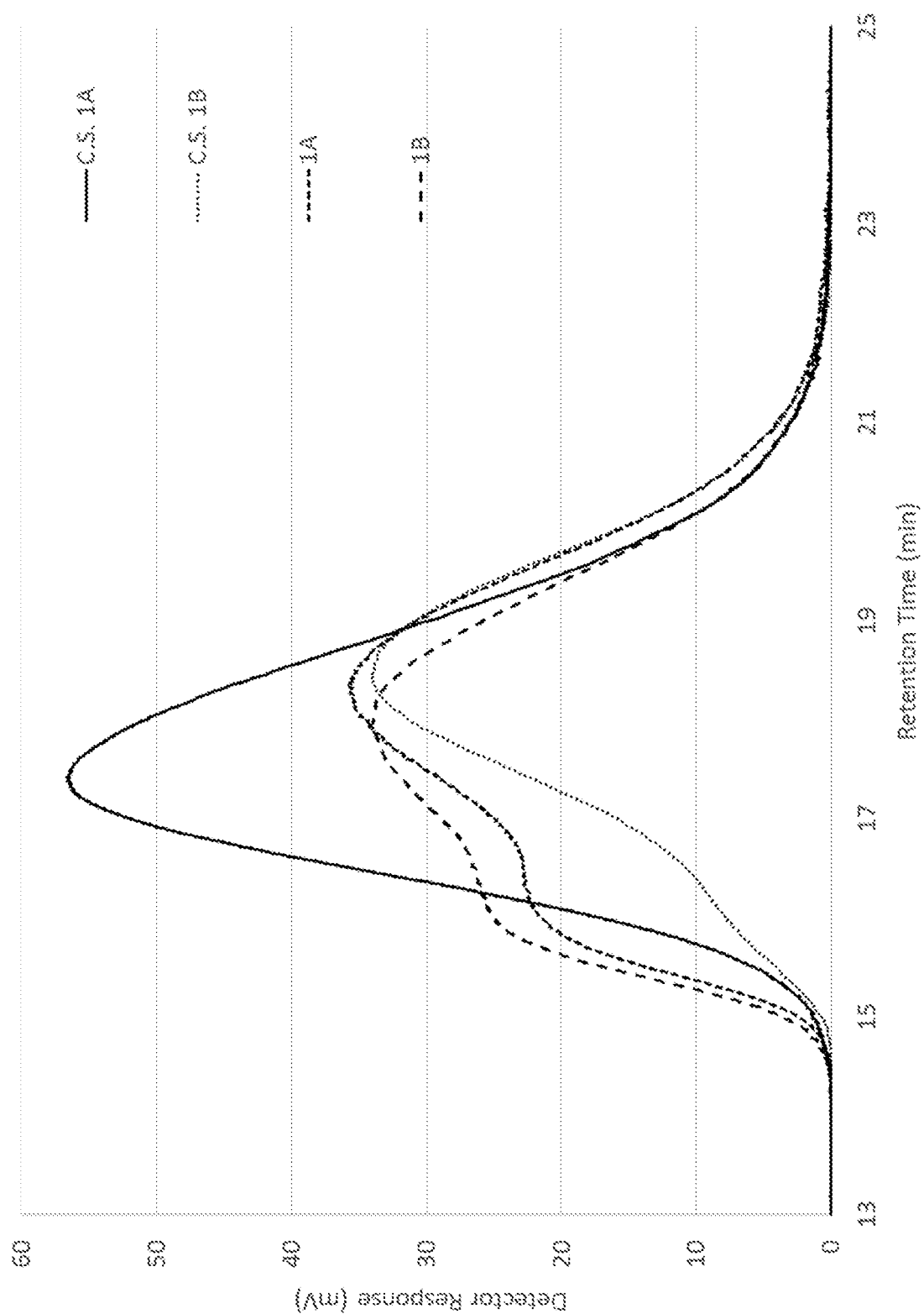
FIG. 1 shows gel permeation chromatography (GPC) curves for Samples 1A and 1B and C.S. 1A and C.S. 1B from Example 1.

The following definitions are provided to define several of the terms used throughout this application.

As used herein, the term "hydrocarbyl groups" refers to univalent functional groups derived from hydrocarbons by removal of a hydrogen atom from a carbon atom of the hydrocarbon.

As used herein, the term "substituted hydrocarbyl groups" refers to univalent functional groups derived from substituted hydrocarbons by removal of a hydrogen atom from a carbon atom of the substituted hydrocarbon. In this definition, the term "substituted hydrocarbon" refers to compounds derived from acyclic, monocyclic, and polycyclic, unbranched and branched hydrocarbons in which (1) one or more of the hydrogen atoms of the hydrocarbon is replaced with a non-hydrogen atom (e.g., a halogen atom) or a non-hydrocarbyl functional group (e.g., a hydroxy group or heteroaryl group) and/or (2) the carbon-carbon chain of the hydrocarbon is interrupted by an oxygen atom (e.g., as in an ether), a nitrogen atom (e.g., as in an amine), or a sulfur atom (e.g., as in a sulfide).

As used herein, the term "substituted alkyl groups" refers to univalent functional groups derived from substituted alkanes by removal of a hydrogen atom from a carbon atom of the alkane. In this definition, the term "substituted alkanes" refers to compounds derived from acyclic unbranched and branched hydrocarbons in which (1) one or more of the hydrogen atoms of the hydrocarbon is replaced with a non-hydrogen atom (e.g., a halogen atom) or a non-alkyl functional group (e.g., a hydroxy group, aryl group, or heteroaryl group) and/or (2) the carbon-carbon chain of the hydrocarbon is interrupted by an oxygen atom (as in an ether), a nitrogen atom (as in an amine), or a sulfur atom (as in a sulfide).

As used herein, the term "substituted cycloalkyl groups" refers to univalent functional groups derived from substituted cycloalkanes by removal of a hydrogen atom from a carbon atom of the cycloalkane. In this definition, the term "substituted cycloalkanes" refers to compounds derived from saturated monocyclic and polycyclic hydrocarbons (with or without side chains) in which (1) one or more of the hydrogen atoms of the hydrocarbon is replaced with a non-hydrogen atom (e.g., a halogen atom) or a non-alkyl functional group (e.g., a hydroxy group, aryl group, or heteroaryl group) and/or (2) the carbon-carbon chain of the hydrocarbon is interrupted by an oxygen atom, a nitrogen atom, or a sulfur atom.

As used herein, the term "alkenyl groups" refers to univalent functional groups derived from acyclic, unbranched and branched olefins (i.e., hydrocarbons having one or more carbon-carbon double bonds) by removal of a hydrogen atom from a carbon atom of the olefin.

As used herein, the term "substituted alkenyl groups" refers to univalent functional groups derived from acyclic, substituted olefins by removal of a hydrogen atom from a carbon atom of the olefin. In this definition, the term "substituted olefins" refers to compounds derived from acyclic, unbranched and branched hydrocarbons having one or more carbon-carbon double bonds in which (1) one or more of the hydrogen atoms of the hydrocarbon is replaced with a non-hydrogen atom (e.g., a halogen atom) or a non-alkyl functional group (e.g., hydroxy group, aryl group, heteroaryl group) and/or (2) the carbon-carbon chain of the hydrocarbon is interrupted by an oxygen atom (as in an ether) or a sulfur atom (as in a sulfide).

As used herein, the term "substituted aryl groups" refers to univalent functional groups derived from substituted arenes by removal of a hydrogen atom from a ring carbon atom. In this definition, the term "substituted arenes" refers to compounds derived from monocyclic and polycyclic aromatic hydrocarbons in which one or more of the hydrogen atoms of the hydrocarbon is replaced with a non-hydrogen atom (e.g., a halogen atom) or a non-alkyl functional group (e.g., a hydroxy group).

As used herein, the term "substituted heteroaryl groups" refers to univalent functional groups derived from substituted heteroarenes by removal of a hydrogen atom from a ring atom. In this definition, the term "substituted heteroarenes" refers to compounds derived from monocyclic and polycyclic aromatic hydrocarbons in which (1) one or more of the hydrogen atoms of the hydrocarbon is replaced with a non-hydrogen atom (e.g., a halogen atom) or a non-alkyl functional group (e.g., a hydroxy group) and (2) at least one methine group (—C=) of the hydrocarbon is replaced by a trivalent heteroatom and/or at least one vinylidene group (—CH=CH—) of the hydrocarbon is replaced by a divalent heteroatom.

As used herein, the term "alkanediyl groups" refers to divalent functional groups derived from alkanes by removal of two hydrogen atoms from the alkane. These hydrogen atoms can be removed from the same carbon atom on the alkane (as in ethane-1,1-diyl) or from different carbon atoms (as in ethane-1,2-diyl).

As used herein, the term "substituted alkanediyl groups" refers to divalent functional groups derived from substituted alkanes by removal of two hydrogen atoms from the alkane. These hydrogen atoms can be removed from the same carbon atom on the substituted alkane (as in 2-fluoroethane-1,1-diyl) or from different carbon atoms (as in 1-fluoroethane-1,2-diyl). In this definition, the term "substituted alkanes" has the same meaning as set forth above in the definition of substituted alkyl groups.

As used herein, the term "cycloalkanediyl groups" refers to divalent functional groups derived from cycloalkanes by removal of two hydrogen atoms from the cycloalkane. These hydrogen atoms can be removed from the same carbon atom on the cycloalkane or from different carbon atoms.

As used herein, the term "substituted cycloalkanediyl groups" refers to divalent functional groups derived from substituted cycloalkanes by removal of two hydrogen atoms from the alkane. In this definition, the term "substituted cycloalkanes" has the same meaning as set forth above in the definition of substituted cycloalkyl groups.

As used herein, the term "arenediyl groups" refers to divalent functional groups derived from arenes (monocyclic and polycyclic aromatic hydrocarbons) by removal of two hydrogen atoms from ring carbon atoms.

As used herein, the term "substituted arenediyl groups" refers to divalent functional groups derived from substituted arenes by removal of two hydrogen atoms from ring carbon atoms. In this definition, the term "substituted arenes" refers to compounds derived from monocyclic and polycyclic aromatic hydrocarbons in which one or more of the hydrogen atoms of the hydrocarbon is replaced with a non-hydrogen atom (e.g., a halogen atom) or a non-alkyl functional group (e.g., a hydroxy group).

As used herein, the term "heteroarenediyl groups" refers to divalent functional groups derived from heteroarenes by removal of two hydrogen atoms from ring atoms. In this definition, the term "heteroarenes" refers to compounds derived from monocyclic and polycyclic aromatic hydrocarbons in which at least one methine group (—C=) of the hydrocarbon is replaced by a trivalent heteroatom and/or at least one vinylidene group (—CH=CH—) of the hydrocarbon is replaced by a divalent heteroatom.

As used herein, the term "substituted heteroarenediyl groups" refers to divalent functional groups derived from substituted heteroarenes by removal of two hydrogen atoms from ring atoms. In this definition, the term "substituted heteroarenes" has the same meaning as set forth above in the definition of substituted heteroaryl groups.

Unless otherwise indicated, conditions are 25° C., 1 atmosphere of pressure and 50% relative humidity, concentrations are by weight, and molecular weight is based on weight average molecular weight. The term "polymer" as used in the present application denotes a material having a weight average molecular weight ($M_w$) of at least 5,000. The term "copolymer" is used in its broad sense to include polymers containing two or more different monomer units, such as terpolymers, and unless otherwise indicated, includes random, block, and statistical copolymers. The concentration of ethylene or propylene in a particular phase or in the heterophasic composition is based on the weight of reacted ethylene units or propylene units relative to the total weight of polyolefin polymer in the phase or heterophasic composition, respectively, excluding any fillers or other non-polyolefin additives. The concentration of each phase in the overall heterogeneous polymer composition is based on the total weight of polyolefin polymers in the heterophasic composition, excluding any fillers or other non-polyolefin additives or polymers.

In a first embodiment, the invention provides a polymer composition comprising a thermoplastic polymer and a compatibilizing agent. The thermoplastic polymer present in the composition can be any suitable thermoplastic polymer. In a preferred embodiment, the thermoplastic polymer is a polyolefin polymer. More specifically, the thermoplastic polymer preferably is a polyolefin polymer selected from the group consisting of polypropylenes (e.g., polypropylene homopolymers, polypropylene copolymers, and mixtures thereof), polyethylenes (e.g., high density polyethylene polymers, medium density polyethylene polymers, low density polyethylene polymers, linear low density polyethylene polymers, and mixtures thereof), and mixtures thereof.

The compatibilizing agent can be any organic compound comprising a fulvene moiety or a fulvene-derived moiety. The moiety can be unsubstituted or substituted, meaning that the hydrogens on the ring in the moiety and/or the terminal vinylic carbon atom can be replaced with non-hydrogen groups. Thus, in a preferred embodiment, the compatibilizing agent is selected from the group consisting of compounds comprising a moiety conforming to the structure of Formula (I), compounds comprising a moiety conforming to the structure of Formula (III), and compounds conforming to the structure of Formula (V)

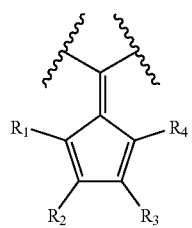

(I)

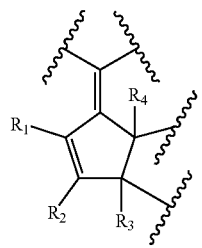

(III)

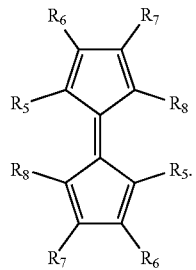

(V)

In the structures of Formula (I) and Formula (III), $R_1$, $R_2$, $R_3$, and $R_4$ are independently selected from the group consisting of hydrogen, halogens, hydrocarbyl groups, and substituted hydrocarbyl groups, provided adjacent hydrocarbyl groups or substituted hydrocarbyl groups can be combined to form a secondary ring fused to the ring of the moiety. Further, at least one of $R_1$, $R_2$, $R_3$, and $R_4$ is a hydrogen; preferably, at least two of $R_1$, $R_2$, $R_3$, and $R_4$ are hydrogens. The truncated bonds (i.e., the bonds truncated by the wavy lines) attached to the terminal vinylic carbon atom (in both Formula (I) and Formula (III)) and the adjacent carbon atoms in the ring (in Formula (III)) represent bonds to other portions of the compatibilizing agent. In the structure of Formula (V), $R_5$, $R_6$, $R_7$, and $R_8$ are independently selected from the group consisting of halogens In a preferred embodiment, $R_1$, $R_2$, $R_3$, and $R_4$ are independently selected from the group consisting of hydrogen, halogens, alkyl groups, substituted alkyl groups, aromatic groups, substituted aromatic groups, heteroaromatic groups, and substituted heteroaromatic groups. Suitable alkyl groups include, but are not limited to, linear and branched $C_1$-$C_{18}$ is alkyl groups. Suitable substituted alkyl groups include, but are not limited to, linear and branched $C_1$-$C_{18}$ alkyl groups substituted with one or more non-hydrogen groups selected from the group consisting of halogens, hydroxy, aromatic groups, substituted aromatic groups, heteroaromatic groups, and substituted heteroaromatic groups. Suitable aromatic groups include, but are not limited to, aromatic groups such as phenyl and naphthyl. Suitable substituted aromatic groups include, but are not limited to, monocyclic and polycyclic aromatic groups substituted with one or more non-hydrogen groups selected from the group consisting of halogens, hydroxy, alkyl groups, and substituted alkyl groups. Suitable heteroaromatic groups include, but are not limited to, furyl, thienyl, pyrrolyl, imidazolyl, pyrazolyl, oxazolyl, pyridinyl, pyrazinyl, pyrimidinyl and benzannulated analogs of such groups, such as benzimidazolyl. Suitable substituted heteroaromatic groups include, but are not limited to, the heteroaromatic groups described above substituted with one or more non-hydrogen groups selected from the group consisting of halogens, hydroxy, alkyl groups, and substituted alkyl groups. In another preferred embodiment, $R_1$, $R_2$, $R_3$, and $R_4$ are each hydrogens.

In a more specific embodiment, the compatibilizing agent can be a compound conforming to the structure of Formula (X) below

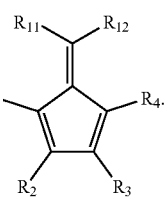

(X)

In the structure of Formula (X), $R_1$, $R_2$, $R_3$, and $R_4$ are independently selected from the groups recited above in the structure of Formula (I), and $R_{11}$ and $R_{12}$ are individual substituents independently selected from the group consisting of hydrogen, alkyl groups, substituted alkyl groups, alkenyl groups, substituted alkenyl groups, amine groups, substituted amine groups, aromatic groups, substituted aromatic groups, heteroaromatic groups, and substituted heteroaromatic groups or $R_{11}$ and $R_{12}$ together form a single substituent selected from the group consisting of aromatic groups, substituted aromatic groups, heteroaromatic groups, and substituted heteroaromatic groups. Preferably, no more than one of $R_{11}$ and $R_{12}$ can be hydrogen.

In a preferred embodiment, $R_{11}$ and $R_{12}$ are independently groups conforming to a structure selected from the group consisting of Formula (C), Formula (CX), and Formula (CXV)

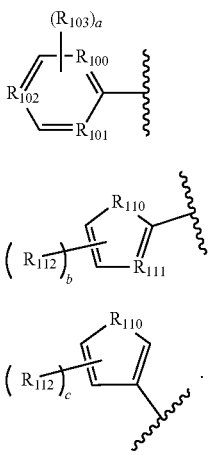

(C)

(CX)

(CXV)

In the structure of Formula (C), $R_{100}$, $R_{101}$, and $R_{102}$ are independently selected from the group consisting of C(H), C($R_{101}$), and a nitrogen atom. The variable a is an integer from 0 to 4, but does not exceed a value equal to 5-z, where z is the number of nitrogen atoms in the ring. Each $R_{101}$ is independently selected from the group consisting alkyl groups (e.g., $C_1$-$C_{10}$ alkyl groups), substituted alkyl groups (e.g., $C_1$-$C_{10}$ substituted alkyl groups), aryl groups (e.g., $C_6$-$C_{12}$ aryl groups), substituted aryl groups (e.g., $C_6$-$C_{12}$ substituted aryl groups), heteroaryl groups (e.g., $C_4$-$C_{12}$ heteroaryl groups), substituted heteroaryl groups (e.g., $C_4$-$C_{12}$ substituted heteroaryl groups), halogens, nitro groups, cyano groups, amine groups, hydroxy groups, alkoxy groups (e.g., $C_1$-$C_{10}$ alkoxy groups), aryloxy groups (e.g., $C_6$-$C_{12}$ aryloxy groups), alkenyl groups (e.g., $C_2$-$C_{10}$ alkenyl groups), alkynyl groups (e.g., $C_2$-$C_{10}$ alkynyl groups), alkyl ester groups (e.g., $C_1$-$C_{10}$ alkyl ester groups), and aryl ester groups (e.g., $C_6$-$C_{12}$ aryl ester groups). Further, two adjacent $R_{101}$ groups can be linked to form a fused ring structure, such as a polycyclic aryl group. In the structure of Formula (CX), $R_{110}$ is selected from the group consisting of an oxygen atom, a sulfur atom, and N($R_{115}$). $R_{115}$ is selected from the group consisting of hydrogen, alkyl groups (e.g., $C_1$-$C_{10}$ alkyl groups), substituted alkyl groups (e.g., $C_1$-$C_{10}$ substituted alkyl groups), aryl groups (e.g., $C_6$-$C_{12}$ aryl groups), and substituted aryl groups (e.g., $C_6$-$C_{12}$ substituted aryl groups). $R_{111}$ is selected from the group consisting of C(H), C($R_{112}$), and a nitrogen atom. $R_{112}$ is selected from the group consisting of alkyl groups (e.g., $C_1$-$C_{10}$ alkyl groups), substituted alkyl groups (e.g., $C_1$-$C_{10}$ substituted alkyl groups), aryl groups (e.g., $C_6$-$C_{12}$ aryl groups), substituted aryl groups (e.g., $C_6$-$C_{12}$ substituted aryl groups), heteroaryl groups (e.g., $C_4$-$C_{12}$ heteroaryl groups), substituted heteroaryl groups (e.g., $C_4$-$C_{12}$ substituted heteroaryl groups), halogens, nitro groups, cyano groups, amine groups, hydroxy groups, alkoxy groups (e.g., $C_1$-$C_{10}$ alkoxy groups), aryloxy groups (e.g., $C_6$-$C_{12}$ aryloxy groups), alkenyl groups (e.g., $C_1$-$C_{10}$ alkenyl groups), alkynyl groups (e.g., $C_2$-$C_{10}$ alkynyl groups), alkyl ester groups (e.g., $C_2$-$C_{10}$ alkyl ester groups), and aryl ester groups (e.g., $C_6$-$C_{12}$ aryl ester groups). Further, two adjacent $R_{112}$ groups can be linked to form a fused ring structure, such as a polycyclic aryl group. The variable b is an integer from 0 to 2. In the structure of Formula (CXV), $R_{110}$ and $R_{112}$ are selected from the same groups described above for Formula (CX), and the variable c is an integer from 0 to 3.

In a preferred embodiment, $R_1$, $R_2$, $R_3$, and $R_4$ are each hydrogen, and $R_{11}$ and $R_{12}$ are each a phenyl group. In another preferred embodiment, $R_1$, $R_2$, $R_3$, and $R_4$ are each hydrogen, and $R_{11}$ and $R_{12}$ are each a 4-chlorophenyl group. In another preferred embodiment, $R_1$, $R_2$, $R_3$, and $R_4$ are each hydrogen, and $R_{11}$ and $R_{12}$ are each a 4-fluorophenyl group. In another preferred embodiment, $R_1$, $R_2$, $R_3$, and $R_4$ are each hydrogen, $R_{11}$ is a methyl group, and $R_{12}$ is a phenyl. In another preferred embodiment, $R_1$, $R_2$, $R_3$, and $R_4$ are each hydrogen, $R_{11}$ is hydrogen, and $R_{12}$ is a 2-thienyl group. In another preferred embodiment, $R_1$, $R_2$, $R_3$, and $R_4$ are each hydrogen, $R_{11}$ is hydrogen, and $R_{12}$ is a 3-thienyl group. In another preferred embodiment, $R_1$, $R_2$, $R_3$, and $R_4$ are each hydrogen, $R_{11}$ is a methyl group, and $R_{12}$ is a 2-furyl group. In another preferred embodiment, $R_1$, $R_2$, $R_3$, and $R_4$ are each hydrogen, $R_{11}$ is hydrogen, and $R_{12}$ is a dimethylamino group. In another preferred embodiment, $R_1$, $R_2$, $R_3$, and $R_4$ are each hydrogen, and $R_{11}$ and $R_{12}$ are each $C_1$-$C_8$ alkyl groups, preferably propyl groups. In another preferred embodiment, $R_1$, $R_2$, $R_3$, and $R_4$ are each hydrogen, $R_{11}$ is hydrogen, and $R_{12}$ is a 2-phenylethenyl group.

The compatibilizing agent can comprise multiple fulvene moieties. For example, the compatibilizing agent can comprise two fulvene moieties and conform to the structure of Formula (XX) below:

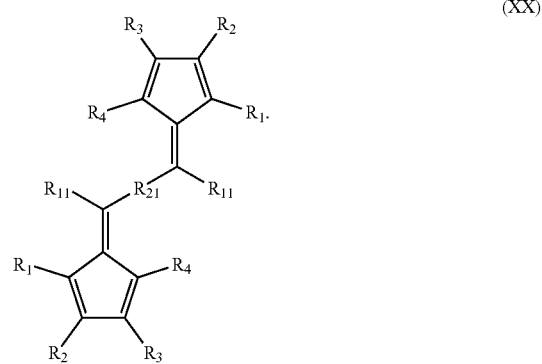

(XX)

In the structure of Formula (XX), each $R_1$, $R_2$, $R_3$, and $R_4$ is independently selected from the groups recited above in the structure of Formula (I), each $R_{11}$ is independently selected from the group recited above in the structure of Formula (X), and $R_{21}$ is selected from the group consisting of alkanediyl groups, substituted alkanediyl groups, arenediyl groups, substituted arenediyl groups, heteroarenediyl groups, and substituted heteroarenediyl groups. In a preferred embodiment, each $R_1$, $R_2$, $R_3$, and $R_4$ is hydrogen, each $R_{11}$ is an aromatic group, and $R_{21}$ is an arenediyl group. More specifically, in such a preferred embodiment, each $R_1$, $R_2$, $R_3$, and $R_4$ is hydrogen, each $R_{11}$ is a phenyl group, and $R_{21}$ is a phen-1,4-diyl group. In another preferred embodiment, each $R_1$, $R_2$, $R_3$, $R_4$, and $R_{11}$ is hydrogen, and $R_{21}$ is an arenediyl group, preferably a phen-1,4-diyl group.

In certain instances, the compatibilizing agent can undergo a dimerization or oligomerization via an auto-Diels-Alder reaction. In such an auto-Diels-Alder reaction, the cyclopentadienyl moiety in one molecule of the compatibilizing agent acts as the diene and a double bond in the cyclopendtadienyl moiety of another molecule of the compatibilizing agent acts as the dienophile. When a fulvene moiety conforming to the structure of Formula (I) is the dienophile in a Diels-Alder reaction, the fulvene moiety is transformed into a moiety conforming to the structure of Formula (III) above. In the structure of Formula (III) above, the truncated bonds attached to the adjacent carbon atoms in the ring represent bonds forming part of a cyclic moiety resulting from the reaction with the diene. Thus, in a more specific example of a compatibilizing agent comprising a moiety conforming to the structure of Formula (III) above, the compatibilizing agent can comprise a moiety conforming to the structure of Formula (IIIA) below

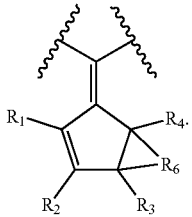

(IIIA)

In the structure of Formula (IIIA), $R_1$, $R_2$, $R_3$, and $R_4$ are selected from the groups recited above, and $R_6$ is a vicinal divalent moiety comprising at least one double bond, such as a divalent cyclic moiety (e.g., a divalent cyclopentenyl moiety). When $R_6$ is a divalent cyclic moiety (e.g., a divalent cyclopentenyl moiety), the compatibilizing agent comprises a bicyclic moiety formed by the bonds to adjacent carbon atoms in the cyclic moiety.

The dimer resulting from the auto-Diels-Alder reaction of a compatibilizing agent conforming to the structure of Formula (X) above will conform to the structure of Formula (XA) below

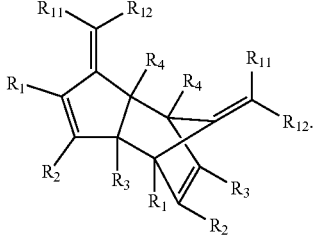

(XA)

In the structure of Formula (XA), $R_1$, $R_2$, $R_3$, $R_4$, $R_{11}$, and $R_{12}$ are selected from the groups disclosed above for the compound conforming to the structure of Formula (X). The dimer can be either the endo or exo isomer. Further, a dimer possessing the structure of Formula (XA) can serve as the dienophile in subsequent Diels-Alder reactions with a diene, with such subsequent reactions yielding a variety of oligomeric species. While not wishing to be bound to any particular theory, it is believed that the dimeric and oligomeric species described above can undergo a retro-Diels-Alder reaction to yield the fulvene-containing compounds from which the dimeric and oligomeric species were originally derived. It is believed that this retro-Diels-Alder reaction can occur when a polymer composition containing the dimeric or oligomeric species is heated during processing, such as the heating that occurs when the polymer composition is extruded.

The compatibilizing agent can have any suitable molar mass. As will be understood by those of ordinary skill in the art, the molar mass of a compound, in combination with other factors, influences the melting point and boiling point of a compound. Thus, compounds with higher molar masses generally have higher melting points and boiling points. While not wishing to be bound to any particular theory, it is believed that the melting point and boiling point of the compatibilizing agent may influence the efficacy of the compatibilizing agent in the compositions of the invention. For example, it is believed that a compatibilizing agent having a relatively low molar mass and low boiling point (e.g., a boiling point that is significantly lower than the temperature at which the polymer composition is extruded) may volatilize to a significant degree during the extrusion process, thereby leaving less compatibilizing agent to modify the properties of the polymer composition. Thus, the compatibilizing agent preferably has a molar mass that is high enough that the compatibilizing agent exhibits a boiling point that is greater than the temperature at which the polymer composition is extruded. In a series of preferred embodiments, the compatibilizing agent preferably has a molar mass of about 130 g/mol or more, about 140 g/mol or more, about 150 g/mol or more, or about 160 g/mol or more. Also, it is believed that a compatibilizing agent having a relatively high melting point (e.g., a melting point that is higher than the temperature at which the polymer composition is extruded) may not disperse well in the molten polymer during the extrusion process, or at least not disperse as well as a compatibilizing agent having a melting point below the extrusion temperature. And poor dispersion of the compatibilizing agent will negatively impact the physical property improvements that can be achieved as compared to a well-dispersed compatibilizing agent. Thus, in a series of preferred embodiments, the compatibilizing has a melting point of about 230° C. or less, about 220° C. or less, about 210° C. or less, or about 200° C. or less.

The compatibilizing agent can be present in the polymer composition in any suitable amount. For example, the compatibilizing agent can be present in the polymer composition in an amount of about 10 ppm or more, about 25 ppm or more, about 50 ppm or more, about 100 ppm or more, about 150 ppm or more, about 200 ppm or more, or about 250 ppm or more based on the weight of the thermoplastic polymer and the compatibilizing agent.

It is believed that the compatibilizing agents described above can be used to increase the melt strength of thermoplastic polymers, such as a polypropylene homopolymer. This can be accomplished by, for example, extruding the polymer (e.g., polypropylene homopolymer) with a compatibilizing agent as described above and an organic peroxide as described below. While it is believed that all of the compatibilizing agents described above would increase the melt strength of the polymer in such a process, it is believed that those compatibilizing agents comprising two or more fulvene moieties (e.g., those compatibilizing agents conforming to the structure of Formula (XX)) will exert the greatest influence on the melt strength of the polymer.

In a second embodiment, the invention provides a heterophasic polymer composition comprising a compatibilizing as described above. The subject heterophasic polyolefin polymers that may be advantageously modified according to this embodiment of the present invention are characterized by at least two distinct phases—a propylene polymer phase comprising propylene polymers selected from polypropylene homopolymers and copolymers of propylene and up to 50 wt. % of ethylene and/or $C_4$-$C_{10}$ α-olefins and an ethylene polymer phase comprising ethylene polymers selected from ethylene homopolymers and copolymers of ethylene and $C_3$-$C_{10}$ α-olefins. The ethylene content of the ethylene polymer phase is at least 8 wt. %. When the ethylene phase is a copolymer of ethylene and $C_3$-$C_{10}$ α-olefins, the ethylene content of the ethylene phase may range from 8 to 90 wt. %. In one embodiment of the invention, the ethylene content of the ethylene phase is at least 50 wt. %. Either the propylene polymer phase or the ethylene polymer phase may form the continuous phase and the other will form the discrete or dispersed phase. For example, the ethylene polymer phase may be the discontinuous phase and the polypropylene polymer phase may be the continuous phase. In one embodiment of the invention, the propylene content of the propylene polymer phase is greater than the propylene content of the ethylene polymer phase.

The relative concentrations of the propylene polymer phase and the ethylene polymer phase may vary over a wide range. By way of example, the ethylene polymer phase may comprise from 5 to 80 wt. % of the total of propylene polymers and ethylene polymers in the composition and the propylene polymer phase may comprise from 20 to 95 wt. % of the total of propylene polymers and ethylene polymers in the composition.

In various embodiments of the invention, (i) the ethylene content may range from 5 to 75 wt. %, or even 5 to 60 wt. %, based on the total propylene polymer and ethylene polymer content in the heterophasic composition, (ii) the ethylene polymer phase may be an ethylene-propylene or ethylene-octene elastomer, and/or (iii) the propylene content of the propylene polymer phase may be 80 wt. % or greater.

The present invention is particularly useful to modify a polypropylene impact copolymer. The impact copolymer may be characterized by a continuous phase comprising polypropylene polymers selected from polypropylene homopolymers and copolymers of propylene and up to 50 wt. % of ethylene and/or $C_4$-$C_{10}$ α-olefins and a discontinuous phase comprising elastomeric ethylene polymers selected from ethylene/$C_3$-$C_{10}$ α-olefin monomers and the ethylene polymers have an ethylene content of from 8 to 90 wt. %.

In various embodiments of the invention directed to propylene impact copolymers, (i) the ethylene content of the discontinuous phase may be from 8 to 80 wt. %, (ii) the ethylene content of the heterophasic composition may be from 5 to 30 wt. %, based on the total propylene polymers and ethylene polymers in the composition; (iii) the propylene content of the continuous phase may be 80 wt. % or greater and/or (iv) the discontinuous phase may be from 5 to 35 wt. % of the total propylene polymers and ethylene polymers in the composition.

Examples of heterophasic polyolefin polymers that may be modified are impact copolymers characterized by a relatively rigid, polypropylene homopolymer matrix (continuous phase) and a finely dispersed phase of ethylene-propylene rubber (EPR) particles. Polypropylene impact copolymer may be made in a two-stage process, where the polypropylene homopolymer is polymerized first and the ethylene-propylene rubber is polymerized in a second stage. Alternatively, the impact copolymer may be made in three or more stages, as is known in the art. Suitable processes may be found in the following references: U.S. Pat. Nos. 5,639,822 and 7,649,052 B2. Examples of suitable processes to make polypropylene impact copolymers are Spheripol®, Unipol®, Mitsui process, Novolen process, Spherizone®, Catalloy®, Chisso process, Innovene®, Borstar®, and Sinopec process. These processes could use heterogeneous or homogeneous Ziegler-Natta or metallocene catalysts to accomplish the polymerization.

The heterophasic polyolefin polymer composition may be formed by melt mixing two or more polymer compositions, which form at least two distinct phases in the solid state. By way of example, the heterophasic polyolefin composition may comprise three distinct phases. The heterophasic polyolefin polymer composition may result from melt mixing two or more types of recycled polyolefin compositions. Accordingly, the phrase "providing a heterophasic polyolefin polymer composition" as used herein includes employing a polyolefin polymer composition in the process that is already heterophasic, as well as melt mixing two or more polyolefin polymer compositions during the process, wherein the two or more polyolefin polymer compositions form a heterophasic system. For example, the heterophasic polyolefin polymer may be made by melt mixing a polypropylene homopolymer and an ethylene/α-olefin copolymer, such as an ethylene/butene elastomer. Examples of suitable copolymers would be Engage™, Exact®, Vistamaxx®, Versify™, INFUSE™, Nordel™, Vistalon®, Exxelor™, and Affinity™. Furthermore, it can be understood that the miscibility of the polyolefin polymer components that form the heterophasic system may vary when the composition is heated above the melting point of the continuous phase in the system, yet the system will form two or more phases when it cools and solidifies. Examples of heterophasic polyolefin polymer compositions may be found in U.S. Pat. No. 8,207,272 B2 and EP 1 391 482 B1.

In one embodiment of the invention, the heterophasic polyolefin polymer to be modified does not have any polyolefin constituents with unsaturated bonds, in particular, both the propylene polymers in the propylene phase and the ethylene polymers in the ethylene phase are free of unsaturated bonds.

In another embodiment of the invention, in addition to the propylene polymer and ethylene polymer components, the heterophasic system may include an elastomer, such as elastomeric ethylene copolymers, elastomeric propylene copolymers, styrene block copolymers, such as styrene-butadiene-styrene (SBS), styrene-ethylene-butylene-styrene (SEBS), styrene-ethylene-propylene-styrene (SEPS) and styrene-isoprene-styrene (SIS), plastomers, ethylene-propylene-diene terpolymers, LLDPE, LDPE, VLDPE, polybutadiene, polyisoprene, natural rubber, and amorphous polyolefins. The rubbers may be virgin or recycled.

The heterophasic polyolefin polymer composition is modified by mixing the polymer composition with a compatibilizing agent in the presence of free radicals, which have been generated in the composition.

In one embodiment of the invention, the heterophasic polyolefin polymer composition is modified by melt mixing the polymer composition with a compatibilizing agent in the presence of free radicals, which have been generated in the composition. The melt mixing step is conducted under conditions such that the composition is heated to above the melting temperature of the major polyolefin component of the composition and mixed while in the molten state. Examples of suitable melt mixing processes include melt compounding, such as in an extruder, injection molding, and mixing in a Banbury mixer or kneader. By way of example, the mixture may be melt mixed at a temperature of from 160° C. to 300° C. In particular, propylene impact copolymers may be melt mixed at a temperature of from 180° C. to 290° C. The polymer composition (propylene polymer phase and ethylene polymer phase), compatibilizing agent and an organic peroxide may be melt compounded in an extruder, at a temperature above the melting temperature of all of the polyolefin polymers in the composition.

In another embodiment of the invention, the polymer may be dissolved in a solvent and the compatibilizing agent added to the polymer solution, and the radicals generated in solution. In another embodiment of the invention, the compatibilizing agent may be combined with the polymer in the solids state and free radicals could be generated during solid-state shear pulverization as described in Macromolecules, "Ester Functionalization of Polypropylene via Controlled Decomposition of Benzoyl Peroxide during Solid-State Shear Pulverization"—vol. 46, pp. 7834-7844 (2013).

Conventional processing equipment may be used to mix the propylene polymers, ethylene polymers and compatibilizing agent together in a single step, in the presence of free radicals that are either added to the mixture, such as an organic peroxide, or generated in-situ, such as by shear, UV light, etc. Nevertheless, it is also possible to mix various combinations of the components in multiple steps and in various sequences, and subsequently subject the mixture to conditions whereby the compatibilizing agent reacts with the polyolefin polymers, as described herein.

For example, the compatibilizing agent and/or the free radical generator (when a chemical compound is used) can be added to the polymer in the form of one or masterbatch compositions. Suitable masterbatch compositions can comprise the compatibilizing agent and/or the free radical generator in a carrier resin. The compatibilizing agent and/or the free radical generator can be present in the masterbatch composition in an amount of about 1 wt. % to about 80 wt. % based on the total weight of the composition. Any suitable carrier resin can be used in the masterbatch compositions, such as any suitable thermoplastic polymer. For example, the carrier resin for the masterbatch compositions can be a polyolefin polymer, such as a polypropylene impact copolymer, a polyolefin copolymer, an ethylene/α-olefin copolymer, a polyethylene homopolymer, a linear low density polyethylene polymer, a polyolefin wax, or mixtures of such polymers. The carrier resin can also be a propylene polymer or an ethylene polymer that is the same as or similar to the proplylene polymer or ethylene polymer present in the heterophasic polyolefin polymer composition. Such a masterbatch composition would allow the end user to manipulate the ratio of propylene polymer(s) to ethylene polymer(s) present in the heterophasic polyolefin polymer composition. This may be preferred when the end user needs to modify the propylene to ethylene ratio of a commercial resin grade in order to achieve the desired set of properties (e.g., balance of impact and stiffness).

The compatibilizing agent used in this second embodiment of the invention (i.e., the modified heterophasic polymer composition) can be any of the compatibilizing agents described above in connection with the first embodiment of the invention. Such compatibilizing agents can be used alone or in combination with one another.

The concentration of the compatibilizing agent in the composition can be varied to meet the objectives of the end user. For example, the concentration can be varied in order to achieve a desired increase in the MFR of the polymer composition with a minimal decrease (or potentially even an increase) in the strength of the polymer, in particular the impact strength. In a preferred embodiment, the compatibilizing agent can be present in an amount of about 10 ppm or more, about 50 ppm or more, about 100 ppm or more, about 150 ppm or more, or about 200 ppm or more, based on the total weight of the polymer composition. In another preferred embodiment, the compatibilizing agent can be present in an amount of about 5 wt. % (50,000 ppm) or less, about 4 wt. % (40,000 ppm) or less, about 3 wt. % (30,000 ppm) or less, about 2 wt. % (20,000 ppm) or less, about 1 wt. % (10,000 ppm) or less, or about 0.5 wt. % (5,000 ppm) or less, based on the total weight of the polymer composition. Thus, in certain preferred embodiments, the compatibilizing agent can be present in an amount of about 10 to about 50,000 ppm, about 100 to about 10,000 ppm, or about 200 to about 5,000 ppm, based on the total weight of the polymer composition.

When a chemical free radical generator is employed (as discussed below), the concentration of the compatibilizing agent in the polymer composition can additionally or alternatively be expressed in terms of a ratio between the amount of the compatibilizing agent and the amount of the chemical free radical generator. In order to normalize this ratio for differences in the molecular weight of compatibilizing agents and number of peroxide bonds in the chemical free radical generators, the ratio is usual expressed as a ratio of the number of moles of compatibilizing agent present in the composition to the molar equivalents of peroxide bonds (O—O bonds) present from the addition of the chemical free radical generator. Preferably, the ratio (i.e., ratio of moles of compatibilzing agent to molar equivalents of peroxide bonds) is about 1:10 or more, about 1:5 or more, about 3:10 or more, about 2:5 or more, about 1:2 or more, about 3:5 or more, about 7:10 or more, about 4:5 or more, about 9:10 or more, or about 1:1 or more. In another preferred embodiment, the ratio is about 10:1 or less, about 5:1 or less, about 10:3 or less, about 5:2 or less, about 2:1 or less, about 5:3 or less, about 10:7 or less, about 5:4 or less, about 10:9 or less, or about 1:1 or less. Thus, in a series of preferred embodiments, the compatibilizing agent can be present in the composition in a ratio of moles of compatibilizing agent to molar equivalents of peroxide bonds of about 1:10 to about 10:1, about 1:5 to about 5:1, about 1:4 to about 4:1, about 3:10 to about 10:3, about 2:5 to about 5:2, or about 1:2 to about 2:1.

A free radical generator is employed in the present invention to cause polymer chain scission and thereby positively affect the MFR of the heterophasic polyolefin polymer composition, while generating sufficient free radicals to foster the reaction of the compatibilizing agent with the polyolefin polymers in the composition. The free radical generator may be a chemical compound, such as an organic peroxide or a bis-azo compound, or free radicals may be generated by applying ultrasound, shear, an electron beam (for example β-rays), light (for example UV light), heat and radiation (for example γ-rays and X-rays), to the reaction system, or combinations of the foregoing.

Organic peroxides having one or more O—O functionalities are of particular utility in the present invention. Examples of such organic peroxides include: 2,5-dimethyl-2,5-di(t-butylperoxy)hexane, 2,5-dimethyl-2,5-di(t-butyl peroxy)hexyne-3,3,6,6,9,9-pentamethyl-3-(ethyl acetate)-1, 2,4,5-tetraoxy cyclononane, t-butyl hydroperoxide, hydrogen peroxide, dicumyl peroxide, t-butyl peroxy isopropyl carbonate, di-t-butyl peroxide, p-chlorobenzoyl peroxide, dibenzoyl diperoxide, t-butyl cumyl peroxide; t-butyl hydroxyethyl peroxide, di-t-amyl peroxide and 2,5-dimethylhexene-2,5-diperisononanoate, acetylcyclohexanesulphonyl peroxide, diisopropyl peroxydicarbonate, tert-amyl perneodecanoate, tert-butyl-perneodecanoate, tert-butylperpivalate, tert-amylperpivalate, bis(2,4-dichlorobenzoyl)peroxide, diisononanoyl peroxide, didecanoyl peroxide, dioctanoyl peroxide, dilauroyl peroxide, bis(2-methylbenzoyl)peroxide, disuccinoyl peroxide, diacetyl peroxide, dibenzoyl peroxide, tert-butyl per-2-ethylhexanoate, bis(4-chlorobenzoyl)peroxide, tert-butyl perisobutyrate, tert-butyl permaleate, 1,1-bis(tert-butylperoxy)-3,5,5-trimethylcyclo-hexane, 1,1-bis(tert-butylperoxy)cyclohexane, tert-butyl peroxyisopropyl carbonate, tert-butyl perisononaoate, 2,5-dimethylhexane 2,5-dibenzoate, tert-butyl peracetate, tert-amyl perbenzoate, tert-butyl perbenzoate, 2,2-bis(tert-butylperoxy)butane, 2,2-bis(tert-butylperoxy)propane, dicumyl peroxide, 2,5-dimethylhexane 2,5-di-tert-butylperoxid, 3-tert-butylperoxy-3-phenyl phthalide, di-tert-amyl peroxide, α,α'-bis(tert-butylperoxyisopropyl)benzene, 3,5-bis(tert-butylperoxy)-3,5-dimethyl-1,2-dioxolane, di-tert-butyl peroxide, 2,5-dimethylhexyne 2,5-di-tert-butyl peroxide, 3,3,6,6,9,9-hexamethyl-1,2,4,5-tetraoxacyclononane, p-menthane hydroperoxide, pinane hydroperoxide, diisopropylbenzene mono-α-hydroperoxide, cumene hydroperoxide or tert-butyl hydroperoxide.

The organic peroxide can be present in the polymer composition in any suitable amount. The suitable amount of organic peroxide will depend upon several factors, such as the particular polymer that is used in the composition, the starting MFR of the polymer, and the desired change in the MFR of the polymer. In a preferred embodiment, the organic peroxide can be present in the polymer composition in an amount of about 10 ppm or more, about 50 ppm or more, or about 100 ppm or more, based on the total weight of the polymer composition. In another preferred embodiment, the organic peroxide can be present in the polymer composition in an amount of about 2 wt. % (20,000 ppm) or less, about 1 wt. % (10,000 ppm) or less, about 0.5 wt. % (5,000 ppm) or less, about 0.4 wt. % (4,000 ppm) or less, about 0.3 wt. % (3,000 ppm) or less, about 0.2 wt. % (2,000 ppm) or less, or about 0.1 wt. % (1,000 ppm) or less, based on the total weight of the polymer composition. Thus, in a series of preferred embodiments, the organic peroxide can be present in the polymer composition in an amount of about 10 to about 20,000 ppm, about 50 to about 5,000 ppm, about 100 to about 2,000 ppm, or about 100 to about 1,000 ppm, based on the total weight of the polymer composition. The amount of organic peroxide can also be expressed in terms of a molar ratio of the compatibilizing agent and peroxide bonds, as is described above.

Suitable bis azo compounds may also be employed as a source of free radicals. Such azo compounds are for example 2,2'-azobisisobutyronitrile, 2,2'-azobis(2-methylbutyronitrile), 2,2'-azobis(2,4-dimethylvaleronitrile), 2,2'-azobis(4-methoxy-2,4-dimethylvaleronitrile), 1,1'-azobis(1-cyclohexanecarbonitrile), 2,2'-azobis(isobutyramide)dihydrate, 2-phenylazo-2,4-dimethyl-4-methoxyvaleronitrile, dimethyl 2,2'-azobisisobutyrate, 2-(carbamoylazo)isobutyronitrile, 2,2'-azobis(2,4,4-trimethylpentane), 2,2'-azobis(2-methylpropane), 2,2'-azobis(N,N'-dimethyleneisobutyramidine) as free base or hydrochloride, 2,2'-azobis(2-amidinopropane) as free base or hydrochloride, 2,2'-azobis{2-methyl-N-[1,1-bis(hydroxymethyl)ethyl]propionamide} or 2,2'-azobis{2-methyl-N-[1,1-bis(hydroxymethyl)-2-hydroxyethyl]propionamide}.

Other chemical compounds useful as free radical initiators include 2,3-dimethyl-2,3-diphenylbutane and sterically hindered hydroxylamine ester.

The various radical generators may be employed alone or in combination.

The heterophasic polyolefin composition of the present invention is compatible with various types of additives conventionally used in thermoplastic compositions, including stabilizers, UV absorbers, hindered-amine light stabilizers (HALS), antioxidants, flame retardants, acid neutralizers, slip agents, antiblocking agents, antistatic agents, antiscratch agents, processing aids, blowing agents, colorants, opacifiers, clarifiers, and/or nucleating agents. By way of further example, the composition may comprise fillers, such as calcium carbonate, talc, glass fibers, glass spheres, inorganic whiskers such as Hyperform® HPR-803i available from Milliken Chemical, USA, magnesium oxysulfate whiskers, calcium sulfate whiskers, calcium carbonate whiskers, mica, wollastonite, clays, such as montmorillonite, and bio-sourced or natural filler. The additives may comprise up to 75 wt. % of the total components in the modified heterophasic polyolefin composition.

The heterophasic polyolefin composition of the present invention may be used in conventional polymer processing applications, including but not limited to injection molding, thin-wall injection molding, single-screw compounding, twin-screw compounding, Banbury mixing, co-kneader mixing, two-roll milling, sheet extrusion, fiber extrusion, film extrusion, pipe extrusion, profile extrusion, extrusion coating, extrusion blow molding, injection blow molding, injection stretch blow molding, compression molding, extrusion compression molding, compression blow forming, compression stretch blow forming, thermoforming, and rotomolding. Thermoplastic polymer articles made using the thermoplastic polymer composition of the invention can be comprised of multiple layers, with one or any suitable number of the multiple layers containing a thermoplastic polymer composition of the invention. By way of example, typical end-use products include containers, packaging, automotive parts, bottles, expanded or foamed articles, appliance parts, closures, cups, furniture, housewares, battery cases, crates, pallets, films, sheet, fibers, pipe, and rotationally molded parts.

The following examples further illustrate the subject matter described above but, of course, should not be construed as in any way limiting the scope thereof. The following methods, unless noted, were used to determine the properties described in the following examples.

Each of the compositions was compounded by blending the components in a closed container for approximately one minute. The compositions were then melt compounded on a Prism TSE-16-TC co-rotating, fully intermeshing, parallel, twin-screw extruder with a 16 mm screw diameter and a length/diameter ratio of 25:1. The barrel temperature of the extruder was ramped from approximately 195° C. to approximately 215° C., and the screw speed was set at approximately 500 rpm. The extrudate (in the form of a strand) for each polypropylene copolymer composition was cooled in a water bath and subsequently pelletized.

The pelletized compositions were then used to form bars by injection molding the compositions on a Nissei HM7 7 ton injection molder having a 14 mm diameter screw. The barrel temperature of the injection molder was approximately 215 to 230° C., and the mold temperature was approximately 25° C. The resulting bars measured approximately 80 mm long, approximately 10 mm wide, and approximately 4.0 mm thick.

The melt flow rate (MFR) was determined on the pelletized compositions according to (ASTM D1238) at 230° C. with a load of 2.16 kg for polypropylene.

The notched Izod impact strength for the bars was measured according to ISO method 180/A. The notched Izod impact strength was measured at +23° C. on bars that had been conditioned at either +23° C. or −30° C. Flexural modulus strength for the bars was measured according to ISO method 178. Differential scanning calorimetry was performed following ASTM E794 in order to measure Peak $T_c$.

The molecular weight distribution (MWD) as well as the weight average of said distribution, $M_w$, was determined using gel permeation chromatography (GPC), also referred to as size exclusion chromatography (SEC). All measurements were conducted by the use of the Agilent PL-GPC 220 GPC/SEC system containing (3) 300×7.5 mm PLgel 10 µm Mixed-B LS, a Refractive Index detector, Viscometer and 15° and 90° Light Scattering detector (at 160° C.) with trichlorobenzene inhibited with 125 ppm butylhydroxytoluene as mobile phase, a column temperature of 160° C. and a sample concentration of approx. 1 mg/ml. In the examples listed below, a 15° light scattering detector is chosen to measure concentration. Gel permeation chromatography is a separation technique in which molecules are separated on the basis of hydrodynamic molecular volume or size. With proper column calibration or by the use of molecular-weight-sensitive detectors, such as light scattering or viscometry, the molecular weight distribution and the statistical molecular weight averages can be obtained. In gel permeation chromatography, molecules pass through a column via a combination of transport into and through beads along with between beads in the column. The time required for passage of a molecule through the column is decreased with increasing molecular weight. The amount of polymer exiting the column at any given time is measured with various detectors. A more in depth description of the instrumentation and detectors can be found in the chapter titled "Composition, Molar Mass and Molar Mass Distribution" in *Characterization and Analysis of Polymers* by Ron Clavier (2008).

Linear viscoelastic behavior was determined using an ARES-G2 rheometer manufactured by TA Instruments and utilized as a measure of long chain branching as described in "Effect of Molecular Structure on the Linear Viscoelastic Behavior of Polyethylene", Macromolecules, 33 (20), 7489-7499 (2000) and "Similarities between Gelation and Long Chain Branching Viscoelastic Behavior", Macromolecules, 34 (10), 3115-3117 (2001) which are herein incorporated by reference in their entirety. Frequency sweep experiments at a temperature of 160° C. were run between 0.0628 and 628.319 rad*s$^{-1}$ in parallel plate (25 mm diameter) configuration with a gap of approximately 1 mm and under a nitrogen atmosphere. The samples for the linear viscoelastic behavior experiments were prepared by injection molding 38 mm diameter, 1.27 mm (50 mil) thick plaques on a Nissei HM7 7 ton injection molder having a 14 mm diameter screw. The barrel temperature of the injection molder was approximately 215 to 230° C., and the mold temperature was approximately 25° C.

Uniaxial extensional rheology was determined using an Extensional Viscosity Fixture (EVF) in an ARES-G2 rheometer manufactured by TA Instruments. A general description of transient uniaxial extensional viscosity measurements is provided, for example, in U.S. Pat. Nos. 6,578,413 and 6,691,569, "Strain Hardening of Various Polyolefins in Uniaxial Elongational Flow", Journal of Rheology, 47 (3), 619-630 (2003) and "Measuring the Transient Extensional Rheology of Polyethylene Melts Using the SER Universal Testing Platform", Journal of Rheology, 49 (3), 585-606 (2005) which are herein incorporated by reference in their entirety. Briefly, the EVF is an extensional viscosity fixture for measurements of the elongation viscosity of high viscosity materials such as polymer melts. The EVF applies uniaxial extensional deformation to a molten polymer sample at a constant rate of strain. The fixture consists of a fixed and rotating drum, which winds up the sample at constant Hencky rate, while measuring the force generated in the sample in a temperature-controlled oven. Constant strain rate experiments at a temperature of 170° C. were run at elongational rates between 0.01 and 1.0 s$^{-1}$. The samples for the uniaxial elongation experiments were prepared by compression molding the polymer at a temperature of 230° C. followed by a slow cooling rate in order to produce a stress-free sample.

Xylene solubles were determined by a modified ASTM D5492-10 and are a measure of the amount of rubber present in the heterophasic polypropylene copolymers. Approximately 0.6 g of polymer was weighed out and placed into a round-bottom flask along with a stir bar. 50 mL of xylene was added to the polymer in the flask. The polymer xylene mixture was heated to reflux temperature while vigorously stirring. Once the reflux temperature was reached, the solution was stirred for an additional 30 min then cooled to room temperature. The resulting polymer/xylene mixture was gently stirred to break up any precipitated polymer gel then poured through a No. 4 filter paper, both the filtrate containing the soluble fraction and the insoluble fraction were collected. A 10 mL aliquot of the filtrate was taken with a Class A pipet and transferred into a weighed pan. The pan containing the filtrate was then placed on a temperature-controlled hot plate maintaining a temperature of 155° C. to evaporate the xylene. Once most of the xylene was evaporated, the pan was transferred to a vacuum oven set at a temperature of 80±10° C. The pressure was reduced to less than 13.3 kPa and the sample was dried for approximately 2 hours or until a constant weight was achieved. The pan mass was then subtracted giving the mass of the residual soluble polymer. The percentage of soluble polymer in the original sample was calculated as follows:

$$S_s = ((V_{bo}/v_{b1}) * (W_2 - W_1))/W_0) * 100$$

where: $S_s$=soluble fraction of sample, %; $V_{bo}$=original volume of solvent, mL; $V_{b1}$=volume of aliquot used for soluble determination, mL; $W_2$=mass of pan and soluble, g; $W_1$=mass of pan, g; and $W_0$=mass of original sample, g.

Example 1

The following example demonstrates the modification of a heterophasic polyolefin composition and performance enhancements achieved, according to the method of the present invention.

Four heterophasic polymer compositions were produced. Comparative Sample 1A (C.S. 1A) was an unmodified polypropylene copolymer. Comparative Sample 1B (C.S. 1B) was made with the same polypropylene copolymer vis-broken using a peroxide. Samples 1A and 1B were made with the same vis-broken polypropylene copolymer compounded with diphenylfulvene as a compatibilizing agent. The general formulation for these samples is set forth in Table 1.

TABLE 1

Heterophasic polypropylene copolymer formulations.

| Component | Loading |
| --- | --- |
| Polypropylene copolymer (LyondellBasell Pro-Fax SD375S with approximately 19% xylene solubles) | Balance |
| Primary antioxidant (Irganox ® 1010) | 500 ppm |
| Secondary antioxidant (Irgafos ® 168) | 1000 ppm |
| Acid scavenger (calcium stearate) | 800 ppm |
| Peroxide (Varox DBPH) | See Table 2 |
| Additive (Compatibilizing Agent) Diphenylfulvene | See Table 2 |

Irganox ® 1010 is available from BASF
Irgafos ® 168 is available from BASF
Varox DBPH is an organic peroxide available from R. T. Vanderbilt Company Each of the compositions listed in Table 2 was mixed, extruded, and injection molded according to the above procedure. The bars were then subjected to melt flow rate and Izod impact testing described above, and evaluated using the 15° light scattering detector signal during testing by Gel Permeation Chromatography (GPC).

TABLE 2

Performance in medium-impact, heterophasic polypropylene copolymer.

| | \multicolumn{4}{c}{Sample} | | | |
|---|---|---|---|---|
| | C.S. 1A | C.S. 1B | 1A | 1B |
| Peroxide Loading (ppm) | — | 1000 | 1000 | 1000 |
| Additive Loading (Molar ratio Additive:O—O) | — | — | 2:1 | 1:1 |
| Additive Loading (ppm) | — | — | 792 | 1584 |
| Melt Flow Rate (g/10 min) | 17.1 | 102.1 | 68.7 | 36.8 |
| Izod impact at 23° C. (J/m) | 105.9 | 53.1 | 107.7 | Non-breaks |
| Izod impact at −30° C. (J/m) | 45.1 | 39.5 | 47.2 | 47.1 |

Surprisingly, when diphenylfulvene is added at 792 ppm loading, as demonstrated in Sample 1A, the 23° C. Izod Impact strength remains equal to the starting resin but the melt flow rate remains high. The inventive Sample 1B, where diphenylfulvene is added at 1584 ppm loading, achieves a desirable non-break behavior and higher MFR than the starting resin.

The resulting change in polymer molecular weight for each of the composition is shown in FIG. 1. When peroxide is added to polypropylene, the molecular weight is decreased as indicated by the peak shift to longer retention times and there is a relative decrease in signal at retention times less than about 16 minutes. The inventive compositions (Samples 1A and 1B) show a shift back to shorter retention times (higher molecular weights) and a pronounced shoulder at a retention time of about 16 minutes, not observed in the unmodified or peroxide modified heterophasic resin. This shoulder indicates the formation of a modified polymer with molecular weight higher than that of either the unmodified or peroxide modified heterophasic resin.

Example 2

The following example demonstrates the production of several heterophasic polyolefin compositions as described above and investigates the performance enhancements achieved through the incorporation of the compatibilizing agents as described above.

Compatibilizing agents according to the invention and comparative compounds were each melt mixed into different batches of heterophasic polypropylene copolymer compositions, in accordance with the general formulation set forth in Table 3. Table 4 sets forth the structure, loading and performance of the compatibilizing agent or comparative compound used in each composition.

TABLE 3

Polypropylene copolymer formulations.

| Component | Loading |
|---|---|
| Polypropylene copolymer (LyondellBasell Pro-Fax SD375S with approximately 19% xylene solubles) | Balance |
| Primary antioxidant (Irganox ® 1010) | 500 ppm |
| Secondary antioxidant (Irgafos ® 168) | 1000 ppm |
| Acid scavenger (calcium stearate) | 800 ppm |
| Peroxide (Varox DBPH) | 1000 ppm |
| Compatibilizing Agent | See Table 4 |

Irganox ® 1010 is available from BASF
Irgafos ® 168 is available from BASF
Varox DBPH is available from R. T. Vanderbilt Company Each of the heterophasic polypropylene copolymer compositions was mixed, extruded, and injection molded according to the procedure described above. The melt flow rate and Izod impact values (at 23° C.) for the compositions were measured and percent change of the melt flow rate and the Izod impact value for each composition (as compared to the unmodified, virgin resin) are reported in Table 4 below. Some of the tested compositions containing a compatibilizing agent according to the invention did not completely fracture during the Izod impact testing. These compositions are reported in Table 4 as "Non-Break" and "Partial." Since these "Non-Break" and "Partial" break samples did not completely fracture, the Izod impact value of the samples could not be quantified using this test. In other words, the impact strength of these samples exceeded the limits of the test. Further, since the impact strength of the "Non-Break" and "Partial" break samples could not be quantified using the same test as the unmodified polypropylene copolymer (i.e., the vis-broken copolymer without a compatibilizing agent), a percent change of the Izod impact value could not be calculated. Nevertheless, the fact that the samples did not fracture completely during the test reveals that the impact strength of the polymer was significantly increased.

TABLE 4

Compatibilizing agent identification numbers (Compound ID) and compound structures.

| Compound ID | Structure | Loading (1:1 molar) | 1:1 MFR % | 1:1 RT Izod % |
|---|---|---|---|---|
| FuI-1 (diphenyl-fulvene) | 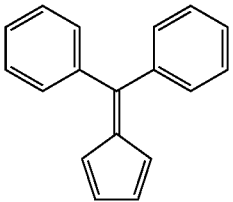 [SMILES: C1=CC(=C(c2ccccc2)c2ccccc2)C=C1] | 1584 | 57% | NB |

TABLE 4-continued

Compatibilizing agent identification numbers (Compound ID) and compound structures.

| Compound ID | Structure | Loading (1:1 molar) | 1:1 MFR % | 1:1 RT Izod % |
|---|---|---|---|---|
| FuI-2 | (cyclopentadienylidene bis(4-chlorophenyl)methane) | 2059 | 48% | NB |
| FuI-3 | (cyclopentadienylidene bis(4-fluorophenyl)methane) | 1831 | 64% | NB |
| FuI-4 | (4-cyclopentadienylidene heptane) | 1116 | 192% | 19.7% |
| FuI-5 | (cyclopentadienylidene (1-phenyl)ethane) | 1157 | 117% | NB |
| FuI-7 | (cyclopentadienylidene (2-thienyl)methane) | 1103 | 58% | NB |
| FuI-8 | (cyclopentadienylidene (2-furyl)ethane) | 1089 | 85% | NB |
| FuI-10 | (9-(diphenylmethylene)fluorene) | 2275 | 846% | −52.2% |

TABLE 4-continued

Compatibilizing agent identification numbers (Compound ID) and compound structures.

| Compound ID | Structure | Loading (1:1 molar) | 1:1 MFR % | 1:1 RT Izod % |
|---|---|---|---|---|
| FuI-11 | | 1241 | 158% | 42.7% |
| FuI-12 | | 2854 | 232% | 21.5% |
| FuI-13 | | 2634 | −81% | NB |
| FuI-14 | | 1586 | −21% | 23.4% |
| FuI-15 | | 2781 | 16% | 44.9% |

TABLE 4-continued

Compatibilizing agent identification numbers (Compound ID) and compound structures.

| Compound ID | Structure | Loading (1:1 molar) | 1:1 MFR % | 1:1 RT Izod % |
|---|---|---|---|---|
| FuI-16 | 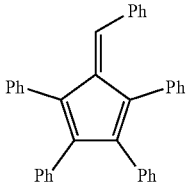 [SMILES: C(=C1C(c2ccccc2)=C(c2ccccc2)C(c2ccccc2)=C1c1ccccc1)c1ccccc1] | 3160 | 424% | −43.9% |
| FuI-17 | 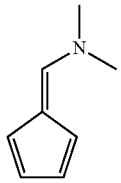 | 833 | 420% | −36.2% |
| FuI-18 | 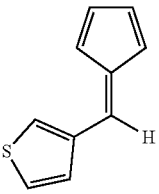 [SMILES: C1=CC(=Cc2ccsc2)C=C1] | 1102 | 147% | NB |
| FuI-19 | 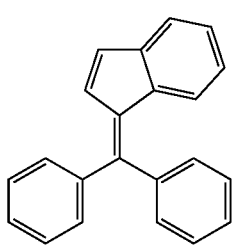 [SMILES: C1=Cc2ccccc2C1=C(c1ccccc1)c1ccccc1] | 1931 | 232% | 41.2% |
| FuI-20 | 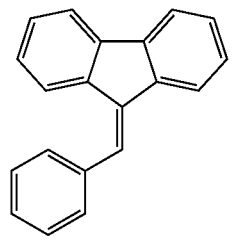 [SMILES: C(=C1c2ccccc2-c2ccccc21)c1ccccc1] | 1751 | 317% | −27.1% |

The results set forth in Table 4 demonstrate that compositions containing compatibilizing agents according to the invention can achieve significant increases in the melt flow rate as compared to the virgin, non-vis-broken resin. These results also demonstrate that compositions containing compatibilizing agents according to the invention can achieve measurable (and in many cases significant) increases in Izod impact strength of the polymer. The significance of the increase can vary depending on the loading of the compatibilizing agent, but each compatibilizing agent according to the invention was able to achieve at least a 5% increase over the expected Izod impact value at one of the tested loadings, which is believed to be a commercially significant increase. Many of the compatibilizing agents were capable of producing greater than 15% increases over the expected Izod impact value. Further, a comparison of the data for Compound Ful-10, Compound Ful-16 and Compound Ful-20 show that structurally similar compounds (i.e., compounds that are structurally similar to the compatibilizing agent of the invention but do not possess all of the defined features) do not yield significant increases over the expected Izod impact value.

Example 3

The following example demonstrates the production of a modified heterophasic polyolefin composition, created by melt mixing a polypropylene homopolymer, a polyolefin elastomer, an organic peroxide and the compatibilizing agent of the present invention.

In particular, a 2 dg/min polypropylene homopolymer (Total Petrochemicals 3276), 20 w/w % of a polyolefin elastomer (Engage™ 7467 from The Dow Chemical Company), an organic peroxide (Varox DBPH available from R.T. Vanderbilt Company) and diphenylfulvene were melt mixed and tested. The results were compared to the heterophasic polyolefin composition created when peroxide only was present and when neither the peroxide nor the compatibilizing agent were present.

The loadings of the peroxide and diphenylfulvene are listed in Table 5. Each of the polymer blend compositions was mixed, extruded, and injection molded according to the above procedure. The bars were then subjected to melt flow rate and Izod impact testing as described above.

TABLE 5

Heterophasic polyolefin composition formed during melt mixing

|  | Sample | | |
| --- | --- | --- | --- |
|  | C.S. 3A | C.S. 3B | 3A |
| Peroxide Loading (ppm) | — | 1000 | 1500 |
| Additive Loading (Molar ratio Additive:O—O) | — | — | 1:1 |
| Additive Loading (ppm) | — | — | 2379 |
| Melt Flow Rate (g/10 min) | 2.3 | 26.0 | 7.2 |
| Izod impact at 23° C. (J/m) | Non-break | 76.0 | Non-break |
| Izod impact at −30° C. (J/m) | 24.1 | 36.6 | 37.6 |

The blend of the polypropylene homopolymer and the polyolefin elastomer without either the peroxide or the compatibilizing agent (C.S. 3A), exhibits non-break Izod impact behavior at 23° C., but has an undesirably low melt flow rate. When peroxide is added to the blend (C.S. 3B), the melt flow rate increases substantially, but the 23° C. Izod Impact Strength is undesirably reduced from a non-break to 76 J/m. Surprisingly, when diphenylfulvene is added at a 2379 ppm loading, as demonstrated in Sample 3A, the melt flow rate remains high, the 23° C. Izod Impact strength exhibits non-break behavior, and the −30° C. Izod impact strength increases substantially. The inventive Sample 3A achieves a desirable balance of high melt flow rate and high Izod Impact Strength performance at both 23° C. and −30° C.

Example 4

The following example demonstrates the production of a branched homopolymer polypropylene composition, created by melt mixing a homopolymer polypropylene, an organic peroxide and a compatibilizing agent as described herein.

In particular, a 2 dg/min melt flow rate homopolymer polypropylene marketed under the name Total Petrochemicals 3276 by Total Petrochemicals, an organic peroxide (Varox DBPH available from R.T. Vanderbilt Company) and Ful-13 were melt mixed and tested using the formulations listed in Table 6 and Table 7. The results were compared to the homopolymer polyolefin composition created when peroxide only was present and when neither the peroxide nor the compatibilizing agent were present.

TABLE 6

Polypropylene homopolymer formulations.

| Component | Loading |
| --- | --- |
| Polypropylene Homopolymer (Total Petrochemicals 3276) | Balance |
| Primary antioxidant (Irganox ® 1010) | 500 ppm |

TABLE 6-continued

Polypropylene homopolymer formulations.

| Component | Loading |
| --- | --- |
| Secondary antioxidant (Irgafos ® 168) | 1000 ppm |
| Acid scavenger (calcium stearate) | 400 ppm |
| Peroxide (Varox DBPH) | See Table 7 |
| Compatibilizing Agent (Ful-13) | See Table 7 |

Irganox ® 1010 is available from BASF
Irgafos ® 168 is available from BASF
Varox DBPH is available from R. T. Vanderbilt Company Each of the polymer blend compositions was mixed, extruded, and injection molded according to the above procedure. The bars were then subjected to melt flow rate, thermal analysis and flexural modulus testing as described above. Samples for uniaxial extensional rheology were compression molded from the pelletized extruded polymer strand and were tested as described above.

TABLE 7

Homopolymer polyolefin composition formed during melt mixing

|  | Sample | | |
| --- | --- | --- | --- |
|  | C.S. 4A | C.S. 4B | 4A |
| Peroxide Loading (ppm) | — | 1000 | 1000 |
| Additive Loading (Molar ratio Additive:O—O) | — | — | 1:2 |
| Additive Loading (ppm) | — | — | 5268 |
| Melt Flow Rate (g/10 min) | 2.1 | 36.6 | 0.8 |
| Peak $T_c$ (° C.) | 114 | 114 | 121 |
| 1% Secant Modulus (MPa) | 1056 | 998 | 1467 |

As expected the MFR of the polypropylene homopolymer reacted with peroxide increases significantly. Surprisingly, when Ful-13 is added at a 5268 ppm loading, as demonstrated in Sample 4A, the melt flow rate decreases to below that of the starting resin, C.S. 4A. In addition, the peak $T_c$ and 1% secant modulus are elevated indicating self-nucleation from the newly formed branched structure in Sample 4A.

Figure 2:
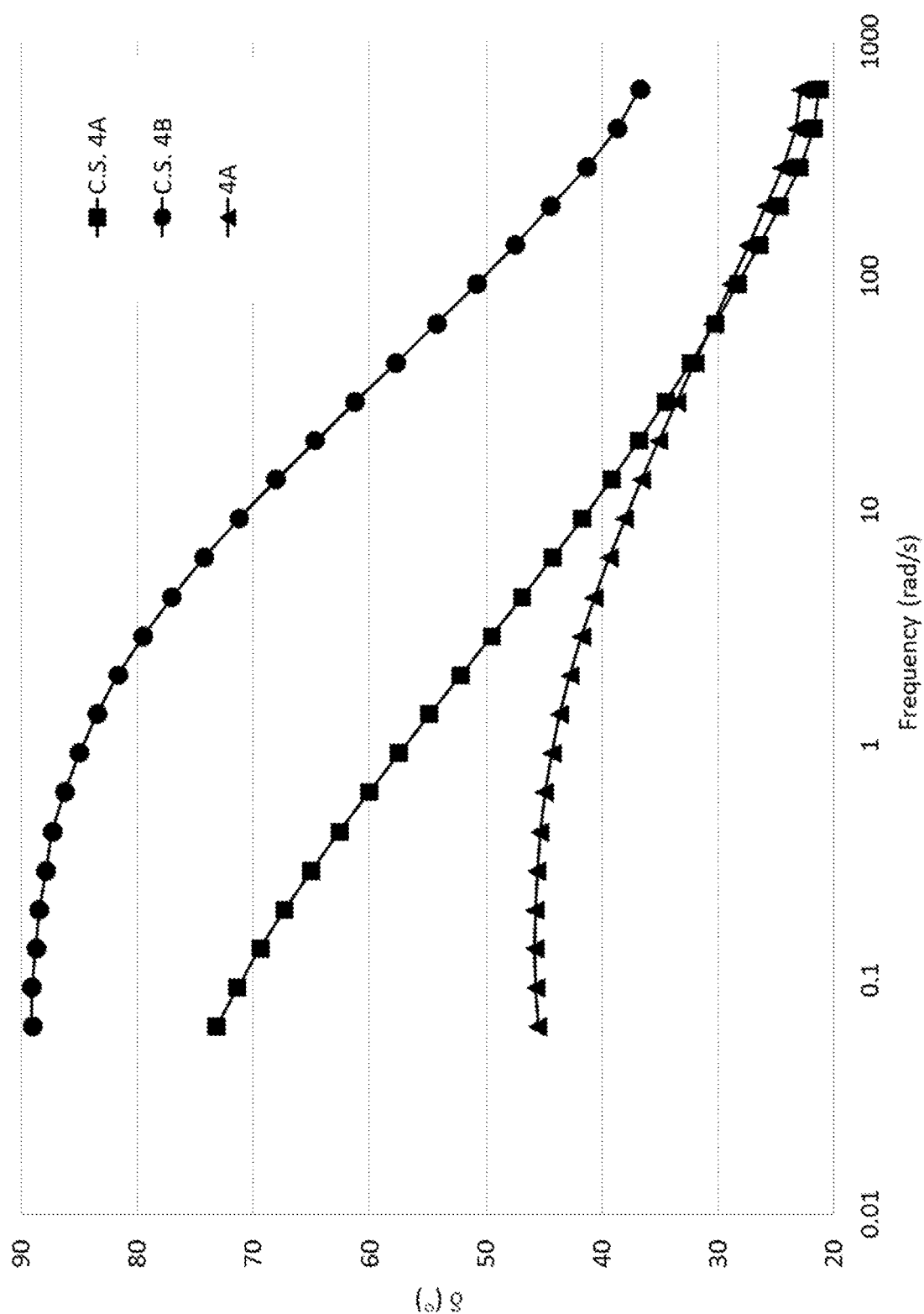
FIG. 2 shows the loss angle (δ) in degrees plotted against the frequency in rad/s for Sample 4A, C.S. 4A, and C.S. 4B as described in Example 4.

FIG. 2 shows the loss angle (δ) in degrees plotted against the frequency in rad/s for C.S. 4A, C.S. 4B and Sample 4A. The loss angle is a sensitive indicator of the presence of LCB. The monotonically decreasing loss angle exemplified for C.S. 4A is as expected for a linear high molecular weight polymer. When peroxide alone (C.S. 4B) is added, the molecular weight and molecular weight distribution are decreased. The curve plotted for C.S. 4B is indicative of a lower molecular weight polymer as it displays a terminal flow region where δ=90°. The curve for the branched material, Sample 4A, is quite different as indicated by the plateau in the loss angle, between 40 and 50°. This plateau is indicative of long chain branching as described in "Effect of Molecular Structure on the Linear Viscoelastic Behavior of Polyethylene," Macromolecules, 33 (20), 7489-7499 (2000) and "Similarities between Gelation and Long Chain Branching Viscoelastic Behavior," Macromolecules, 34 (10), 3115-3117 (2001).

Figure 3:
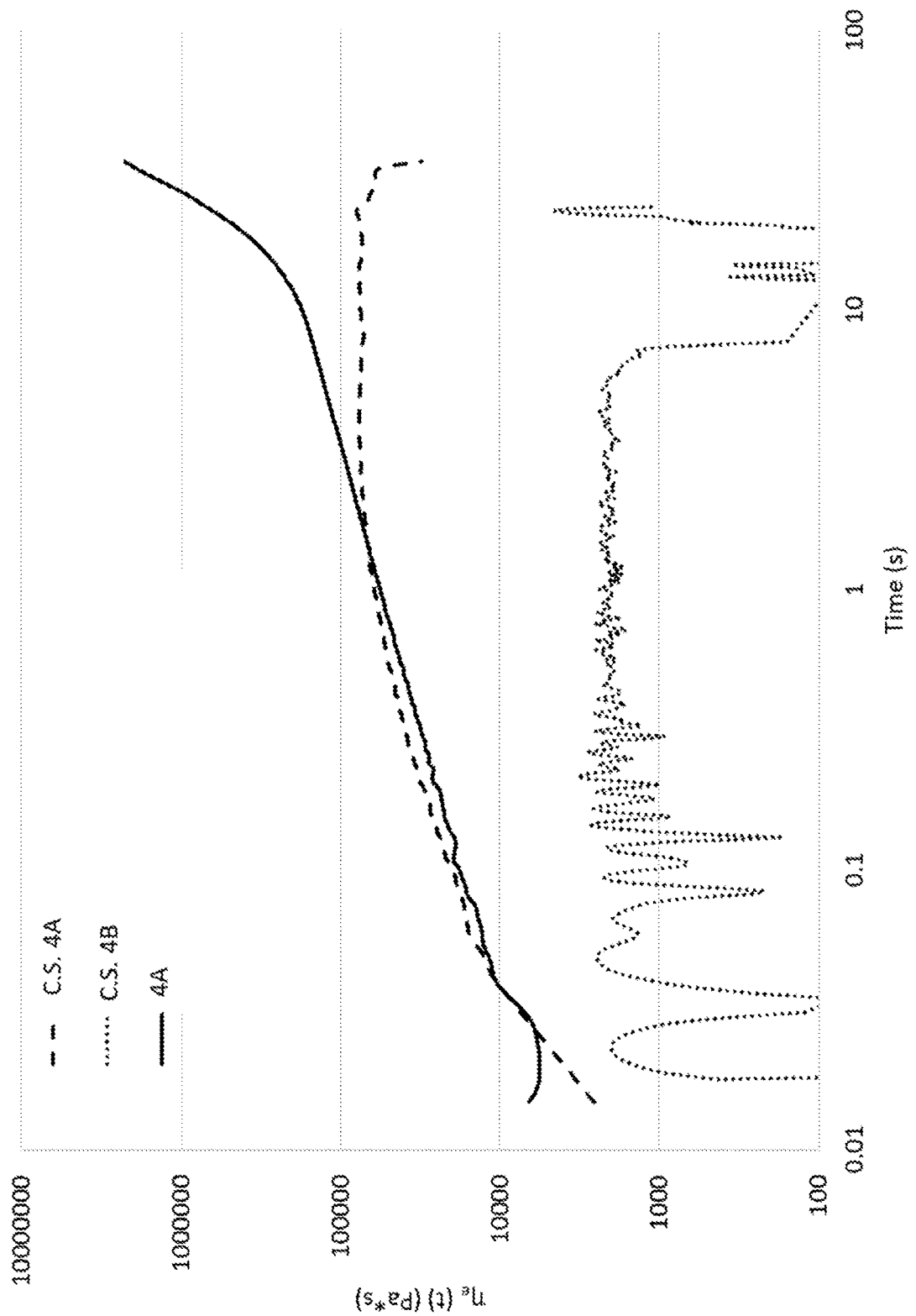
FIG. 3 shows the extensional stress growth function at a Hencky extension rate of 0.1 s$^{-1}$ of Sample 4A, C.S. 4A, and C.S. 4B as described in Example 4.
Figure 4:
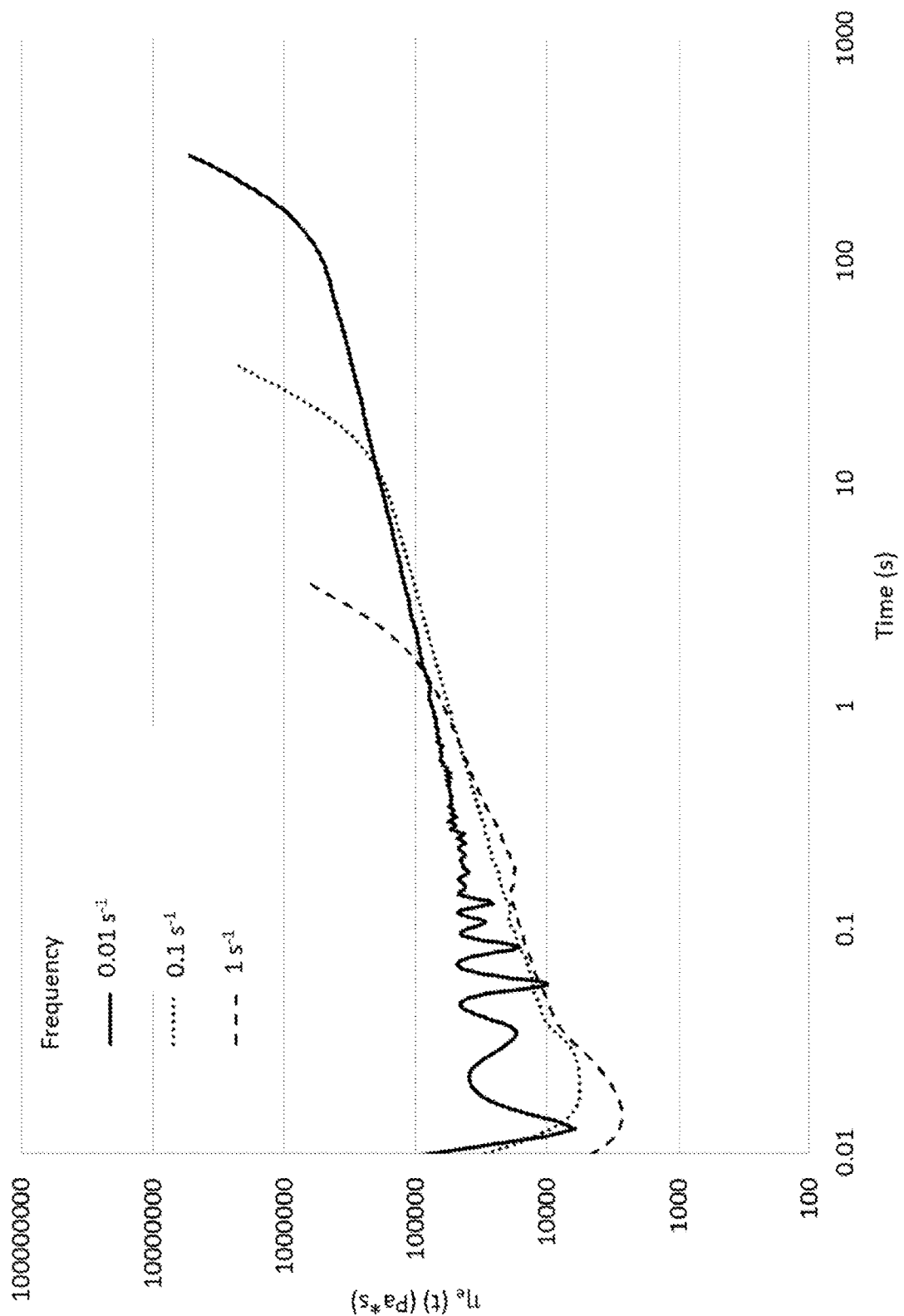
FIG. 4 shows the strain hardening for Sample 4A at Hencky extension rates of 0.1 s$^{-1}$, 0.1 s$^{-1}$, and 1.0 s$^{-1}$ as described in Example 4.

Another method to identify long chain branching is extensional rheology. The extensional stress growth function, $\eta_E^+(t, \dot{\varepsilon})$ is shown in FIG. 3 at a Hencky extension rate of 0.1 s$^{-1}$ for C.S. 4A, C.S. 4B and Sample 4A. Strain hardening is observed as an abrupt upswing of the extensional viscosity in the transient extensional viscosity versus time plot. Strain hardening is evident in Sample 4A when Ful-13 is present and is not measured in C.S. 4A and C.S. 4B, with C.S. 4B being too low in viscosity to properly measure. When Ful-13 is added at 5268 ppm with 1,000 ppm peroxide, giving inventive Sample 4A, strain hardening is observed. It is well known to those skilled in the art, strain hardening is evidence of long chain branching in polymers as described in "Strain Hardening of Various Polyolefins in Uniaxial Elongational Flow", *Journal of Rheology*, 47 (3), 619-630 (2003), "Measuring the Transient Extensional Rheology of Polyethylene Melts Using the SER Universal Testing Platform", *Journal of Rheology*, 49 (3), 585-606 (2005) and "Rheological behavior of blends from a linear and a long-chain branched polypropylene." *Journal of Rheology*, 49, 1059-1079 (2005). FIG. 4 further illustrates strain hardening for Sample 4A via $\eta_E^+(t, \dot{\varepsilon})$ at Hencky extension rates of 0.01, 0.1 and 1.0 s$^{-1}$.

As such, it is obvious to those skilled in the art that inventive Sample 4A demonstrates the desirable incorporation of long chain-branching (LCB) into homopolymer polypropylene.

Example 5

The following example demonstrates the production of compositions and performance enhancements achieved through the incorporation of a compatibilizing agent according to the invention into a high-impact heterophasic polypropylene copolymer.

The resin used for these samples was an 18 MFR high-impact, heterophasic polypropylene copolymer, Pro-Fax SG702 (LyondellBasell Industries) which had approximately 25% xylene solubles. The compositions consisted of the ingredients listed in Table 8.

TABLE 8

High-impact heterophasic polypropylene copolymer

| Component | Amount |
| --- | --- |
| LyondellBasell Pro-Fax SG702 | Balance |
| Primary antioxidant (Irganox ® 1010) | 500 ppm |
| Secondary antioxidant (Irgafos ® 168) | 1000 ppm |
| Calcium stearate | 500 ppm |
| Varox DBPH | See Table 9 |
| Diphenylfulvene | See Table 9 |

Irganox ® 1010 is available from BASF
Irgafos ® 168 is available from BASF
Varox DBPH is available from R. T. Vanderbilt Company Each of the polymer blend compositions was mixed, extruded, and injection molded according to the above procedure. The bars were then subjected to melt flow rate and Izod impact testing described above.

TABLE 9

Performance in high-impact, heterophasic polypropylene copolymer

| | Sample | | |
| --- | --- | --- | --- |
| | C.S. 5A | C.S. 5B | 5A |
| Peroxide Loading (ppm) | — | 500 | 500 |
| Additive Loading (Molar ratio Additive:O—O) | — | — | 2:1 |
| Additive Loading (ppm) | — | — | 396 |
| Melt Flow Rate (g/10 min) | 17.3 | 50.0 | 39.1 |
| Izod impact at 23° C. (J/m) | Non-Break | 111.3 | Non-Break |
| Izod impact at −30° C. (J/m) | 67.2 | 56.5 | 69.6 |

The compositions resulting from the addition of 500 ppm of organic peroxide only (C.S. 5B) demonstrate that as the peroxide is added to the high-impact polypropylene copolymer, the melt flow rate increases significantly, but the Izod impact at 23° C. and −30° C. decreases undesirably. The addition of diphenylfulvene with 500 ppm peroxide shown in Sample 5A demonstrates a desired increase in melt flow rate while the Izod impact performance at 23° C. exhibits highly desirable non-break behavior and the Izod impact performance at −30° C. is maintained.

Example 6

The following example demonstrates the production of heterophasic polymer compositions according to the invention.

The heterophasic polymer compositions used in this example were a blend in which the polypropylene homopolymer was a minority component. In other words, the polypropylene hompolymer was the discrete phase of the heterophasic polymer composition. The polymer blends of the present invention consisted of a polyolefin elastomer (Engage™ 8842 from The Dow Chemical Company) and a 2 dg/min polypropylene homopolymer (Total Petrochemicals 3276) in a ratio of 3:1 w/w. 1,000 ppm of an organic peroxide (Varox DBPH available from R.T. Vanderbilt Company) and diphenylfulvene were added to this polymer blend. The loadings of the peroxide and diphenylfulvene are listed in Table 10, with the balance of the blend being the polyolefin elastomer and polypropylene homopolymer. The results were compared to the heterophasic polyolefin composition created when peroxide only was present (C.S. 6B) and when neither the peroxide nor the compatibilizing agent were present (C.S. 6A).

Each of the compositions was compounded by blending the components in a closed container for approximately one minute. The compositions were then melt compounded on a Prism TSE-16-TC co-rotating, fully intermeshing, parallel, twin-screw extruder with a 16 mm screw diameter and a length/diameter ratio of 25:1. The barrel temperature of the extruder was ramped from approximately 195° C. to approximately 215° C., and the screw speed was set at approximately 500 rpm. The extrudate (in the form of a strand) for each polyolefin blend composition was cooled in a water bath and subsequently pelletized. The pelletized compositions were then compression molded on a 12 ton Carver Press at a platen temperature of 230° C. and a holding pressure of approximately 6 tons for approximately 4 minutes into a sheet that was approximately 6" wide, 6" long, and 0.047" thick. ASTM Type IV dog bone specimens were then die cut from these compression-molded sheets. The tensile properties for the ASTM Type IV dog bones were measured according to ASTM method D638 using an MTS Q-Test-5 with a crosshead speed of 20.0 in/min.

TABLE 10

Performance of Polyolefin Blends

| | Sample | | | | |
| --- | --- | --- | --- | --- | --- |
| | C.S. 6A | C.S. 6B | 6A | 6B | 6C |
| Peroxide Loading (ppm) | — | 1000 | 1000 | 1000 | 1000 |
| Additive Loading (Molar ratio Additve:O—O) | — | — | 1:2 | 1:1 | 2:1 |
| Additive Loading Diphenylfulvene (ppm) | — | — | 793 | 1586 | 3172 |

TABLE 10-continued

Performance of Polyolefin Blends

| | Sample | | | | |
|---|---|---|---|---|---|
| | C.S. 6A | C.S. 6B | 6A | 6B | 6C |
| Tensile Strength at Yield (MPa) | 3.7 | 2.9 | 6.2 | 9.6 | 10.6 |

The composition comprising peroxide only (no compatibilizing agent) demonstrates that when peroxide is added to a polyolefin blend containing a 3:1 w/w ratio of polyolefin elastomer to polypropylene homopolymer, the tensile yield strength decreases slightly. When diphenylfulvene is added to this blend, as shown in Samples 6A-6C, the tensile strength at yield increases significantly.

Example 7

The following example demonstrates the production of compositions and performance enhancements achieved through the incorporation of a compatibilizing agent according to the invention into a recycled post-consumer polypropylene resin.

The resin used for these samples was an 11 MFR polypropylene copolymer recycled post-consumer resin, KW622 (KW PLASTICS). The compositions consisted of the ingredients listed in Table 11.

TABLE 11

Polypropylene copolymer post-consumer resin

| Component | Amount |
|---|---|
| KW PLASTICS KW622 | Balance |
| Primary antioxidant (Irganox ® 1010) | 500 ppm |
| Secondary antioxidant (Irgafos ® 168) | 1000 ppm |
| Calcium stearate | 500 ppm |
| Varox DBPH | See Table 12 |
| Diphenylfulvene | See Table 12 |

Irganox ® 1010 is available from BASF
Irgafos ® 168 is available from BASF
Varox DBPH is available from R. T. Vanderbilt Company Each of the polymer blend compositions was mixed, extruded, and injection molded according to the above procedure. The bars were then subjected to melt flow rate and Izod impact testing described above.

TABLE 12

Performance in polypropylene copolymer post-consumer resin

| | Sample | | |
|---|---|---|---|
| | C.S. 7A | C.S. 7B | 7A |
| Peroxide Loading (ppm) | — | 1,000 | 1,000 |
| Additive Loading (Molar ratio Additive:O—O) | — | — | 1:1 |
| Additive Loading (ppm) | — | — | 1584 |
| Melt Flow Rate (g/10 min) | 10.7 | 34.5 | 16.6 |
| Izod impact at 23° C. (J/m) | 107.7 | 77.0 | Non-break |
| Izod impact at −30° C. (J/m) | 30.2 | 34.2 | 37.5 |

The compositions resulting from the addition of 1,000 ppm of organic peroxide only (C.S. 7B) demonstrate that as the peroxide is added to the polypropylene copolymer post-consumer resin, the melt flow rate increases significantly, but the Izod impact at 23° C. decreases undesirably.

The use of diphenylfulvene with 1,000 ppm peroxide shown in Sample 7A demonstrates a desired increase in melt flow rate while the Izod impact performance at 23° C. exhibits highly desirable non-break behavior and the Izod impact performance at −30° C. is increased.

Example 8

The following example demonstrates the modification of a heterophasic polyolefin composition and performance enhancements achieved, according to the method of the present invention.

Four heterophasic polymer compositions were produced. Comparative Sample 8A (C.S. 8A) was an unmodified polypropylene copolymer (ExxonMobil™ PP7414 with approximately 19% xylenes solubles). Comparative Sample 8B (C.S. 8B) was made with the same polypropylene copolymer vis-broken using a peroxide. Samples 8A and 8B were made with the same vis-broken polypropylene copolymer compounded with diphenylfulvene or the dimer of diphenylfulvene as the compatibilizing agent. The general formulation for these samples is set forth in Table 13.

TABLE 13

Heterophasic polypropylene copolymer formulations

| Component | Loading |
|---|---|
| Polypropylene copolymer (ExxonMobil ™ PP7414 with approximately 19% xylene solubles) | Balance |
| Peroxide (Varox DBPH) | 1000 ppm |
| Additive (Compatibilizing Agent) | See Table 14 |

Varox DBPH is an organic peroxide available from R. T. Vanderbilt Company

The loadings of the peroxide and compatibilizing agent are listed in Table 14. Each of the polymer blend compositions was mixed, extruded, and injection molded according to the above procedure. The bars were then subjected to melt flow rate and Izod impact testing described above.

TABLE 14

Heterophasic polyolefin composition formed during melt mixing

| | Sample | | | |
|---|---|---|---|---|
| | C.S. 8A | C.S. 8B | 8A | 8B |
| Peroxide Loading (ppm) | — | 1000 | 1000 | 1000 |
| Additive | | | Diphenyl-fulvene | Dimer of Diphenyl-fulvene |
| Additive Loading (Molar ratio Additive:O—O) | — | — | 1:1 | 1:1 |
| Additive Loading (ppm) | — | — | 1584 | 3168 |
| Melt Flow Rate (g/10 min) | 21.8 | 94.9 | 59.4 | 29.7 |
| Izod impact at 23° C. (J/m) | 106.3 | 66.1 | 112.4 | 140.6 |

When peroxide is added to the heterophasic polypropylene copolymer (C.S. 8B), the melt flow rate increases substantially, but the 23° C. Izod Impact Strength is undesirably reduced from a 106.3 J/m to 66.1 J/m. Surprisingly, when diphenylfulvene is added at a 1584 ppm loading, as demonstrated in Sample 8A, the melt flow rate remains high and the 23° C. Izod Impact strength increases to 112.4 J/m. When the dimer of diphenylfulvene is added at a 3168 ppm loading (Sample 8B), the melt flow rate is higher than the unmodified polypropylene copolymer (C.S. 8A) and the Izod impact at 23° C. is increased to 140.6 J/m. The inventives Sample 8A and 8B achieve a desirable balance of high melt flow rate and high 23° C. Izod Impact Strength performance.

Example 9

The following example demonstrates the production of a modified masterbatch composition as described above and the physical property improvements that can be achieved through the addition of such a modified masterbatch composition to a heterophasic polyolefin composition.

Three modified masterbatch compositions were produced. Comparative Sample 9-MB (C.S. 9-MB) was made by melt compounding a polypropylene copolymer with a peroxide as a vis-breaking agent. Samples 9A-MB and 9B-MB were made by melting compounding the same polypropylene copolymer with a peroxide as a vis-breaking agent and diphenylfulvene as a compatibilizing agent. The general formulation for these samples is set forth in Table 15.

TABLE 15

Modified masterbatch formulations.

| Component | Loading |
|---|---|
| Polypropylene copolymer (LyondellBasell Pro-Fax SD375S with approximately 19% xylene solubles) | Balance |
| Peroxide (Varox DBPH) | See Table 16 |
| Compatibilizing Agent (Ful-1) | See Table 16 |

Each of the compositions listed in Table 15 was mixed and extruded according to the above procedure.

TABLE 16

Modified masterbatch compositions.

| | Sample | | |
|---|---|---|---|
| | C.S. 9-MB | 9A-MB | 9B-MB |
| Peroxide Loading (ppm) | 1500 | 5,000 | 10,000 |
| Additive Loading (Molar ratio Additive:O—O) | — | 1:1 | 1:1 |
| Additive Loading (ppm) | — | 7,900 | 15,900 |

Three heterophasic polymer compositions were produced by adding the modified masterbatch compositions described above to a polypropylene copolymer. Comparative Sample 9A (C.S. 9A) was the unmodified polypropylene copolymer. Comparative Sample 9B (C.S. 9B) was made by compounding the unmodified polypropylene copolymer with Comparative Sample 9-MB (C.S. 9-MB). Sample 9A was made by compounding the same unmodified polypropylene copolymer with Sample 9A-MB, and Sample 9B was made by compounding the same unmodified polypropylene copolymer with Sample 9B-MB. The general formulation for these samples is set forth in Tables 17 and 18.

TABLE 17

Heterophasic polypropylene copolymer formulations with modified masterbatches.

| Component | Loading |
|---|---|
| Polypropylene copolymer (Exxon PP7414) | Balance |
| C.S. 9-MB | See Table 17 |
| 9A-MB | See Table 17 |
| 9B-MB | See Table 17 |

Each of the compositions listed in Table 18 was mixed, extruded, and injection molded according to the procedures described above. The resulting bars were then subjected to melt flow rate and Izod impact testing as described above.

TABLE 18

Performance in medium-impact, heterophasic polypropylene copolymer

| | Sample | | | |
|---|---|---|---|---|
| | C.S. 9A | C.S. 9B | 9A | 9B |
| C.S. 9-MB (%) | — | 10 | — | — |
| 9A-MB (%) | — | — | 10 | — |
| 9B-MB (%) | — | — | — | 10 |
| Melt Flow Rate (g/10 min) | 19.8 | 20.7 | 20.4 | 19.7 |
| Izod impact at 23° C. (J/m) | 80.5 | 80.6 | 98.5 | 112.4 |

The data set forth in Table 18 demonstrate that a modified masterbatch according to the invention (e.g., a modified masterbatch made by melt compounding a heterophasic polymer with a vis-breaking agent and a compatibilizing agent) can be melt compounded into an unmodified heterophasic polymer, thereby significantly improving the impact strength of the heterophasic polymer. For example, the data for C.S. 9B show that melt compounding the vis-broken masterbatch C.S. 9-MB into the unmodified heterophasic polymer does not appreciably affect the impact strength of the polymer. By way of contrast, the data for Samples 9A and 9B show that melt compounding the unmodified heterophasic polymer with the modified masterbatch compositions Sample 9A-MB and Sample 9B-MB increases the impact strength of the polymer by as much as 40%. This is particularly valuable because it demonstrates that improved heterophasic polymer compositions can be produced without directly adding the vis-breaking agent and/or compatibilizing agent to the target heterophasic polymer. Direct addition of such additives can be difficult in certain settings, such as compounding facilities and injection molding facilities. However, such facilities routinely utilize masterbatch compositions. Therefore, such facilities could readily achieve the physical property improvements described herein through the use of a modified masterbatch composition as described above.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the subject matter of this application (especially in the context of the following claims) are to be construed to cover both the singular and the plural, unless otherwise indicated herein or clearly contradicted by context. The terms "comprising," "having," "including," and "containing" are to be construed as openended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the subject matter of the application and does not pose a limitation on the scope of the subject matter unless otherwise claimed. No language in the specification should be construed as indicating any non-claimed element as essential to the practice of the subject matter described herein.

Preferred embodiments of the subject matter of this application are described herein, including the best mode known to the inventors for carrying out the claimed subject matter. Variations of those preferred embodiments may become apparent to those of ordinary skill in the art upon reading the foregoing description. The inventors expect skilled artisans to employ such variations as appropriate, and the inventors intend for the subject matter described herein to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the present disclosure unless otherwise indicated herein or otherwise clearly contradicted by context.

What is claimed is:

1. A heterophasic polymer composition comprising:
   (a) a propylene polymer phase comprising propylene polymers selected from the group consisting of polypropylene homopolymers and copolymers of propylene and up to 50 wt. % of one or more comonomers selected from the group consisting of ethylene and $C_4$-$C_{10}$ α-olefin monomers;
   (b) an ethylene polymer phase comprising ethylene polymers selected from the group consisting of ethylene homopolymers and copolymers of ethylene and one or more $C_3$-$C_{10}$ α-olefin monomers; and
   (c) a compatibilizing agent, conforming to the structure of Formula (X) below

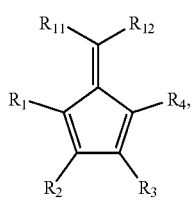

wherein $R_1$, $R_2$, $R_3$, and $R_4$ are independently selected from the group consisting of hydrogen, halogens, hydrocarbyl groups, and substituted hydrocarbyl groups, provided adjacent hydrocarbyl groups or substituted hydrocarbyl groups can be combined to form a secondary ring fused to the ring of the moiety; provided at least one of $R_1$, $R_2$, $R_3$, and $R_4$ is a hydrogen; and wherein $R_{11}$ and $R_{12}$ are independently selected from the group consisting of groups conforming to a structure of Formula (C), Formula (CX), or Formula (CXV)

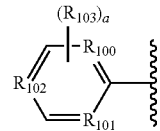

where $R_{100}$, $R_{101}$, and $R_{102}$ are independently selected from the group consisting of C(H), C($R_{103}$), and a nitrogen atom; the variable a is an integer from 0 to 4, but does not exceed a value equal to 5-z, where z is the number of nitrogen atoms in the ring; each $R_{103}$ is independently selected from the group consisting alkyl groups, substituted alkyl groups, aryl groups, substituted aryl groups, heteroaryl groups, substituted heteroaryl groups, halogens, nitro groups, cyano groups, amine groups, hydroxy groups, alkoxy groups, aryloxy groups, alkenyl groups, alkynyl groups, alkyl ester, and aryl ester groups, provided two adjacent $R_{103}$ groups can be linked to form a fused ring structure,

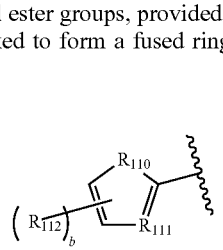

where $R_{110}$ is selected from the group consisting of an oxygen atom, a sulfur atom, and N($R_{115}$); $R_{115}$ is selected from the group consisting of hydrogen, alkyl groups, substituted alkyl groups, aryl groups, and substituted aryl groups; $R_{111}$ is selected from the group consisting of C(H), C($R_{112}$), and a nitrogen atom; $R_{112}$ is selected from the group consisting of alkyl groups, substituted alkyl groups, aryl groups, substituted aryl groups, heteroaryl groups, substituted heteroaryl groups, halogens, nitro groups, cyano groups, amine groups, hydroxy groups, alkoxy groups, aryloxy groups, alkenyl groups, alkynyl groups, alkyl ester groups, and aryl ester groups, provided two adjacent $R_{112}$ groups can be linked to form a fused ring structure; and the variable b is an integer from 0 to 2,

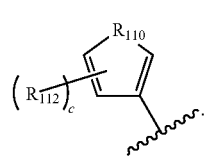

where $R_{110}$ and $R_{112}$ are selected from the same groups described above for the structure of Formula (CX), and the variable c is an integer from 0 to 3.

2. The heterophasic polymer composition of claim 1, wherein $R_1$, $R_2$, $R_3$, and $R_4$ are independently selected from the group consisting of hydrogen, halogens, alkyl groups, substituted alkyl groups, aromatic groups, substituted aromatic groups, heteroaromatic groups, and substituted heteroaromatic groups.

3. The heterophasic polymer composition of claim 1, wherein at least two of $R_1$, $R_2$, $R_3$, and $R_4$ are hydrogens.

4. The heterophasic polymer composition of claim 1, wherein the compatibilizing agent is present in the composition in an amount of about 100 ppm or more based on the weight of the propylene polymer phase, the ethylene polymer phase, and the compatibilizing agent.

5. The heterophasic polymer composition of claim 1, wherein $R_1$, $R_2$, $R_3$, and $R_4$ are independently selected from the group consisting of hydrogen, halogens, alkyl groups, substituted alkyl groups, aromatic groups, substituted aromatic groups, heteroaromatic groups, and substituted heteroaromatic groups.

6. The heterophasic polymer composition of claim 1, wherein the ethylene content of the ethylene polymer phase is at least 8 wt. %.

7. The heterophasic polymer composition of claim 1, wherein the ethylene content of the ethylene polymer phase is at least 50 wt. %.

8. The heterophasic polymer composition of claim 1, wherein the ethylene content of the heterophasic polymer composition is 5 to 75 wt. %, based on the total propylene polymer and ethylene polymer content in the heterophasic composition.

9. The heterophasic polymer composition of claim 1, wherein the ethylene polymer phase is selected from the group consisting of ethylene-propylene elastomers, ethylene-octene elastomers, and mixtures thereof.

10. The heterophasic polymer composition of claim 1, wherein the propylene polymer phase provides a continuous phase and the ethylene polymer phase is a discontinuous phase dispersed in the continuous phase.

11. The heterophasic polymer composition of claim 10, wherein the ethylene polymer phase has an ethylene content of from 8 to 90 wt. %.

12. The heterophasic polymer composition of claim 11, wherein the ethylene polymer phase has an ethylene content of from 8 to 80 wt. %.

13. The heterophasic polymer composition of claim 10, wherein the total ethylene content of the heterophasic composition is from 5 to 30 wt. %.

14. The heterophasic polymer composition of claim 10, wherein the propylene content of the propylene polymer phase is 80 wt. % or greater.

15. The heterophasic polymer composition of claim 10, wherein the ethylene polymer phase is from 5 to 35 wt. % of the total weight of the propylene polymer phase and ethylene polymer phase present in the heterophasic polymer composition.

16. The heterophasic polymer composition of claim 1, wherein the propylene content of the propylene polymer phase is 80 wt. % or more.

* * * * *